(12) United States Patent
Angell et al.

(10) Patent No.: US 7,012,124 B2
(45) Date of Patent: *Mar. 14, 2006

(54) SOLID POLYMERIC ELECTROLYTES FOR LITHIUM BATTERIES

(75) Inventors: Charles A. Angell, Mesa, AZ (US); Wu Xu, Tempe, AZ (US); Xiaoguang Sun, Tempe, AZ (US)

(73) Assignee: Arizona Board of Regents, acting for and on behalf of Arizona State University, Tempe, AZ (US)

( * ) Notice: Subject to any disclaimer, the term of this patent is extended or adjusted under 35 U.S.C. 154(b) by 108 days.

This patent is subject to a terminal disclaimer.

(21) Appl. No.: 10/311,644

(22) PCT Filed: Jun. 16, 2001

(86) PCT No.: PCT/US01/19338

§ 371 (c)(1),
(2), (4) Date: Sep. 19, 2003

(87) PCT Pub. No.: WO01/98396

PCT Pub. Date: Dec. 27, 2001

(65) Prior Publication Data

US 2004/0053137 A1 Mar. 18, 2004

Related U.S. Application Data

(60) Provisional application No. 60/212,230, filed on Jun. 16, 2000, provisional application No. 60/290,864, filed on May 14, 2001.

(51) Int. Cl.
*C08G 77/56* (2006.01)
*C08G 79/10* (2006.01)

(52) U.S. Cl. .................. 528/4; 528/5; 528/9
(58) Field of Classification Search ........... 528/4, 528/5, 9
See application file for complete search history.

(56) References Cited

U.S. PATENT DOCUMENTS

| | | | | |
|---|---|---|---|---|
| 3,161,613 A | * | 12/1964 | Sprung | 528/8 |
| 3,259,591 A | * | 7/1966 | Shepherd | 526/239 |
| 3,487,045 A | * | 12/1969 | Shepard et al. | 525/503 |
| 4,228,270 A | * | 10/1980 | Kobayashi | 528/8 |
| 4,620,944 A | * | 11/1986 | Armand et al. | 252/519.2 |
| 5,484,670 A | | 1/1996 | Angell et al. | |
| 5,506,073 A | | 4/1996 | Angell et al. | |
| 5,660,947 A | | 8/1997 | Wuhr | |
| 5,786,110 A | | 7/1998 | Angell et al. | |
| 5,807,905 A | * | 9/1998 | Cunningham et al. | 522/25 |
| 5,824,433 A | | 10/1998 | Angell et al. | |
| 5,849,432 A | | 12/1998 | Angell et al. | |
| 5,855,809 A | | 1/1999 | Angell et al. | |
| 5,962,169 A | | 10/1999 | Angell et al. | |
| 6,235,433 B1 | | 5/2001 | Amano et al. | |

OTHER PUBLICATIONS

Angell, C., et al., "Variations on the Salt-Polymer Electrolyte Theme for Flexible Solid Electrolytes", article, Solid State Ionics, 86-88, 17-28, 1996.

Angell, C., et al., "Rubbery Solid Electrolytes with Dominant catronic Transport and High Ambient Conductivity", article, Nature, 362, 137-139, Mar. 11, 1993.

MacCallum, J., et al., (eds.), Polymer Electrolytes Reviews, book, V 1, Elsevier, London, 1987.

Ohno, H., "Molten Salt Type Polymer Electrolytes", Electrochimica Acta, 46, 1407-1400, 2001.

Zhang, S., et al., "Molecular and Anionic Polymer System with Micro-Decoupled Conductivities", article, electrochimica Acta, 45, 12-29, 2000.

* cited by examiner

Primary Examiner—Margaret G. Moore
(74) Attorney, Agent, or Firm—Robert D. Atkins; Quarles & Brady, Streich Lang LLP

(57) ABSTRACT

Novel conductive polyanionic polymers and methods for their preparion are provided. The polyanionic polymers comprise repeating units of weakly-coordinating anionic groups chemically linked to polymer chains. The polymer chains in turn comprise repeating spacer groups. Spacer groups can be chosen to be of length and structure to impart desired electrochemical and physical properties to the polymers. Preferred embodiments are prepared from precursor polymers comprising the Lewis acid borate tri-coordinated to a selected ligand and repeating spacer groups to form repeating polymer chain units. These precursor polymers are reacted with a chosen Lewis base to form a polyanionic polymer comprising weakly coordinating anionic groups spaced at chosen intervals along the polymer chain. The polyanionic polymers exhibit high conductivity and physical properties which make them suitable as solid polymeric electrolytes in lithium batteries, especially secondary lithium batteries.

75 Claims, 23 Drawing Sheets

SOLID POLYMERIC ELECTROLYTES FOR LITHIUM BATTERIES

Related Applications

This application is a U.S. National Stage Application filed under 35 U.S.C. 371 claiming priority from the International Application Ser. No. PCT/US01/19338 filed Jun. 16, 2001 and published in English as WO 01/98396 A1 on Dec. 27, 2001, which claims priority from U.S. Provisional Patent Application Ser. No. 60/212,230 filed Jun. 16, 2000 and U.S. Provisional Patent Application Ser. No. 60/290,864 filed May 14, 2001, which applications and publication are incorporated herein by reference.

This application claims priority rights based on U.S. Provisional Applications 60/212,230, filed Jun. 16, 2000 and 60/290,864 filed May 14, 2001. The above-identified provisional applications are hereby incorporated by reference.

Financial assistance for this project was provided by U.S. Government through the National Science Foundation under Grant Number CHE-9808678 and the Department of Energy under Grant Nos. DEFG0393ER14378-003 and DEFG0395ER45541. Therefore the United States Government may own certain rights to this invention.

INTRODUCTION

1. Technical Field

The present invention relates to novel polyanionic polymers having high conductivity suitable for use in solid polymeric electrolytes in lithium batteries, especially secondary lithium batteries.

2. Background

Lithium batteries supply energy to a growing number of portable electrochemical devices and are a promising energy source for larger applications such as electric automobiles. Accordingly, lithium batteries are the subject of intense research and the effort to improve performance continues.

A major area of interest has been in the field of electrolytes for lithium cells where a solid electrolyte with high ionic conductivity, wide electrochemical stability window and good lithium ion transport number has been the goal. Electrolytes are generally prepared by dissolving a highly-conductive salt in a polymer, usually an ether polymer, to make solid polymeric electrolytes (SPE). Examples of the "salt-in-polymer" approach include the electrolytes disclosed in U.S. Pat. Nos. 5,849,432, 5,824,433, 5,660,947, and 6,235,433.

A "polymer-in-salt" approach has also been attempted. In this approach, chain polymers are added as a dilute component to impart solidity to molten alkali metal salt mixtures of high conductivity (1). Unfortunately it has been difficult to find simple salts of lithium that are stable and liquid at room temperature. Examples of the polymer-in-salt approach include U.S. Pat. Nos. 5,962,169, 5,855,809, 5,786,110, 5,506,073 and 5,484,670.

The need for conductive polymers continues to spur the development of new materials. Polymeric films which contain weakly coordinating anionic groups are promising candidates as SPE as they would have good decoupling characteristics and thus high transport number for cations. Batteries and other electronic devices could be made much smaller and lighter by exploiting these films (2).

Attempts have been made to polymerize molten salts into solid films, but the reported conductivity of these films is not high at room temperature (3,4). Other highly conductive polymers have been made by linking anionic imide groups in a polymer and then forming complexes with the anionic groups using Lewis acids such as $AlCl_3$ and $BF_3$ (5). The $AlCl_3$-complexed polymers exhibit very high conductivities, $10^{-3.8}$ $Scm^{-1}$, and good electrochemical characteristics, but are not suitable for commercial use because the potential volatility of $AlCl_3$ and $BF_3$ makes them environmentally unsafe (5). Nevertheless, the high conductivity of the Lewis acid/Lewis base pairs makes them promising candidates as SPE if this problem were solved.

Despite continuing discoveries of highly conductive electrolytic salts, and advances in polymerizing these salts, solid polymer electrolytes for lithium batteries are still needed. Especially sought are weakly coordinating anionic materials that can be fabricated into films with high conductivity.

3. Relevant Literature

1. C. A. Angell, K. Xu, S. S. Zhang and M. Videa, "Variations on the Salt-Polymer Electrolyte Theme for Flexible Solid Electrolytes", Solid State Ionics, 86–88, 17–28 (1996).
2. C. A. Angell, C. Liu and G. Sanchey, "Rubbery Solid Electrolytes with Dominant Catronic Transport and High Ambient Conductivity", Nature, 362, 137–139, Mar. 11, 1993.
3. J. R. MacCallum and C. A. Vincent (Eds.), Polymer Electrolytes Reviews, Vol. 1, Elsevier, London, 1987.
4. H. Ohno, "Molten Salt Type Polymer Electrolytes", Electrochimica Acta, 46, 1407–1411 (2001).
5. S. S. Zhang, Z. Chang, K. Xu and C. A. Angell, "Molecular and Anionic Polymer System with Micro-Decoupled Conductivities", Electrochimica Acta, 45, 12–29 (2000).

SUMMARY OF THE INVENTION

It has been discovered that certain Lewis acids can be readily incorporated into polymeric chains. These stable polymers can be readily converted into conductive polymers by addition of a suitable Lewis base. Stable polymers of Lewis acids and methods for preparing the polymers are provided.

The polymers comprise repeating units of Lewis acid groups chemically bound within chain polymers which in turn comprise repeating spacer groups. The length and number of spacer groups are chosen to position the Lewis acids in the chain at desired repeating intervals.

In the provided method for preparing the subject polymers, certain Lewis acids comprising a Group III element coordinated to three ligands (i.e., under-coordinated) are contacted with polymer chains having end groups reactive with two of the ligands. A Lewis acid-containing chain polymer comprising repeating spacer groups results. In a preferred method wherein the Lewis acid-containing polymer comprises a borate group, the starting material is a boronic acid and spacer groups are linked by reaction with hydroxyl groups on the boronic acid.

The Lewis acid-containing polymers can be readily converted into excellent ionic conductors by reacting them with a weakly associating Lewis base anion, as a negatively charged species, charge compensated by any cation of choice. Examples of conductive polyanionic polymers are given.

Physical properties of the polyanionic polymers can be modified by addition of co-polymers, plasticizers, solvents, ceramic particles and cross-linking which allows them to be formed into conductive films and otherwise fabricated.

Resultant polymeric products are useful as solid polymeric electrolytes for batteries, especially lithium batteries.

BRIEF DESCRIPTION OF THE FIGURES

FIG. 1A illustrates 1:1 (mol) Li salts-P(MEG$_m$EG$_n$B) complexes wherein m is 8 and n is 9.

FIG. 1B illustrates 1:1 (mol) Li salts-P(MEG$_m$EG$_n$B) complexes wherein m is 8 and n is 14.

FIG. 2A illustrates 1:1 (mol) P[Li(MEG$_m$EG$_9$TFSIB)] complexes wherein m is 1,3,8, or 12.

FIG. 2B illustrates 1:1 (mol) P[Li(MEG$_8$EG$_n$TFSIB) complexes wherein n is 2,5,9 or 14.

FIG. 2C illustrates 1:1 (mol) LiTFSI—P(MEG$_3$EG$_n$B) complexes wherein n is 2,5,9 or 14.

FIG. 2D illustrates P[Li(PhEGnTFSIB)]phenyl borate complexes with different values of repeating spacer groups and ratios of salt to polymer. The conductivity of the imide salt is given for comparison.

3A–C illustrate a study of a preferred embodiment of the present polyanionic polymer having the formula {lithium [polymethoxy-oligo(ethylene glycol)$_m$oligo(ethylene glycol)$_n$trifluoromethane sulfanates borate}, (herein abbreviated as P[Li(MEG$_m$EG$_n$CF$_3$SO$_3$B)] where m represents the length of the branch chain and is 1–12 and n represents the length of spacer chain and is 2–14. The figures illustrate the effect of the length of branching ligand and the effect of spacer chain length on the conductivity of the polyanionic polymer at various temperatures.

Figure 1A:
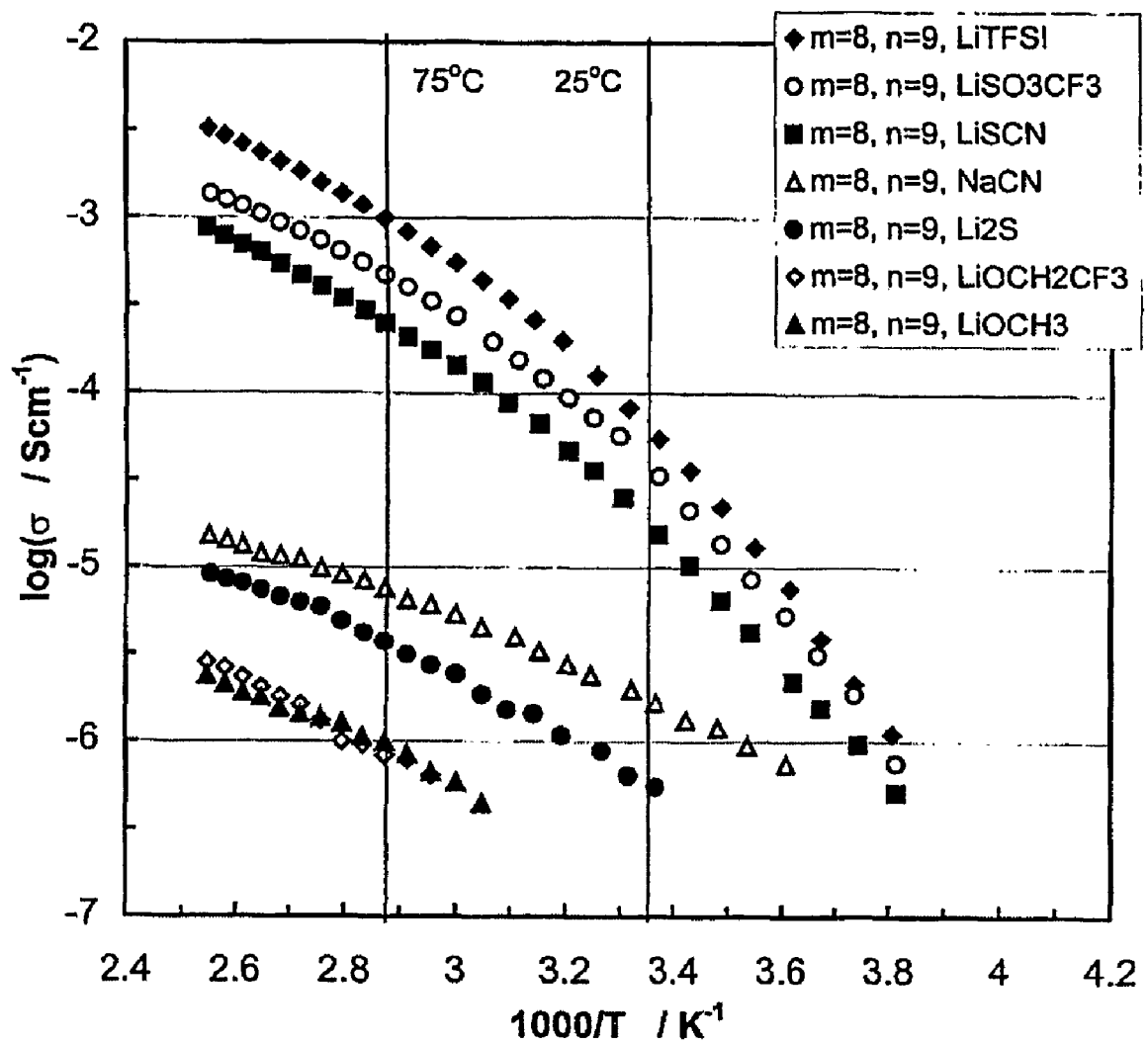
FIGS. 1A and 1B give the conductivities of polyanionic polymers formed by addition of certain anionic Lewis bases to a preferred Lewis-acid-containing polymer. The Lewis acid is borate bound to the ligand methoxy-oligo(ethylene glycol)$_8$ (MEG$_8$). The polymer chain comprises repeat spacer groups ethylene glycol (Egn). The Lewis bases are anionic components of the following salts:
lithium bis(trifluoromethanesulfonyl)imide [LiN(SO$_2$CF$_3$)$_2$, LiTFSI or LiImide]
lithium trifluoromethanesulfonate (LiSO$_3$CF$_3$)
lithium thiocyanate (LiSCN)
sodium cyanide (NaCN)
lithium methoxide (LiOCH$_3$)
lithium 2,2,2-trifluoroethoxide (LiOCH$_2$CF$_3$)
lithium sulfide (Li$_2$S)
Figure 1B:
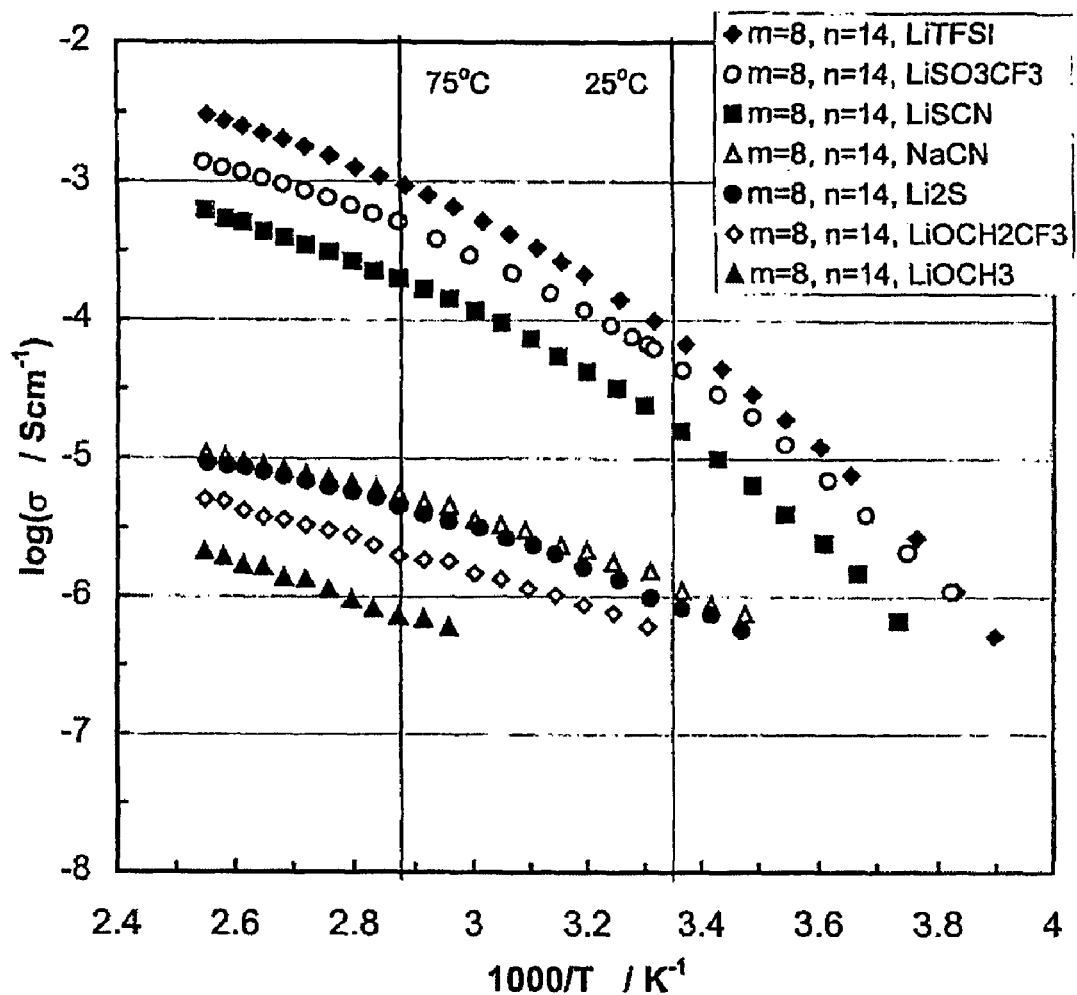
Figure 2A:
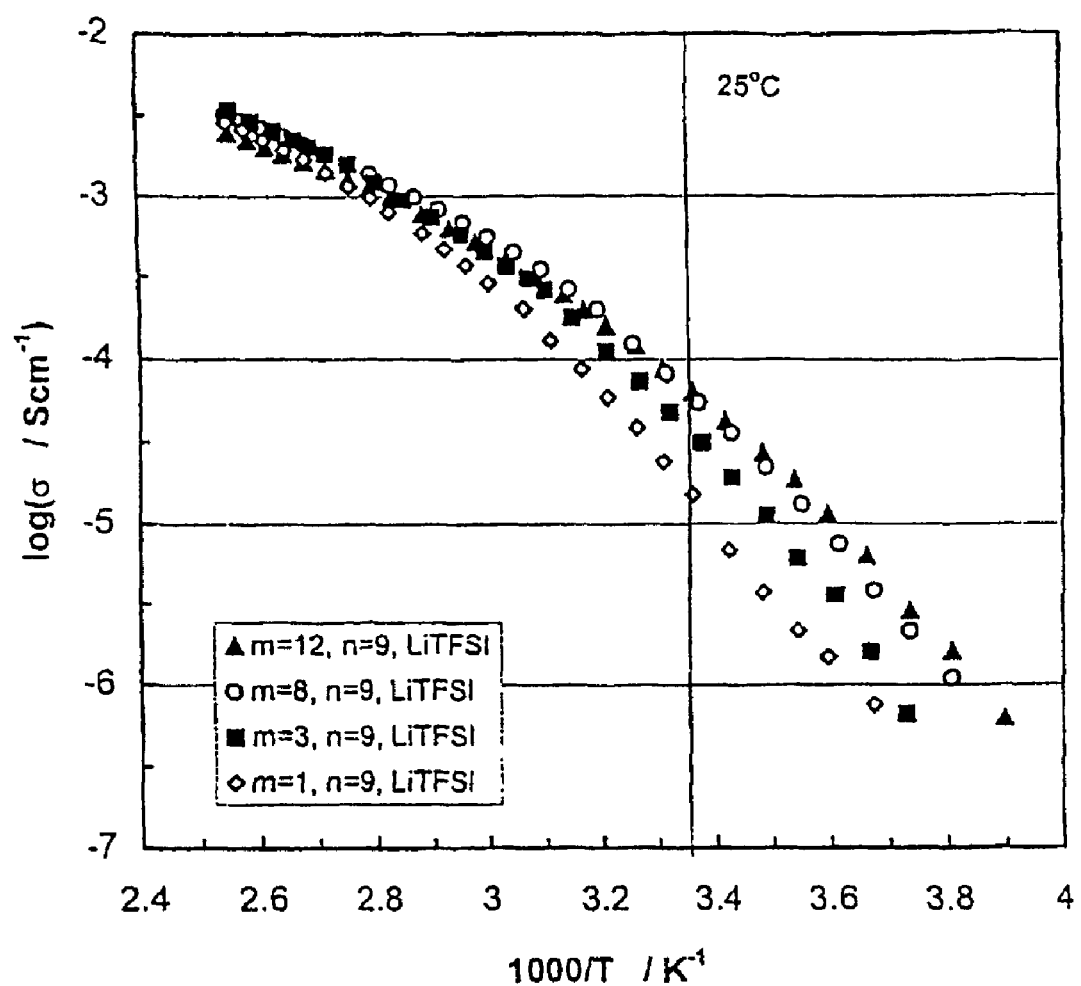
FIGS. 2A–2D illustrate a study of a preferred embodiment of the present polyanionic polymer having the formula poly lithium [methoxy-oligo(ethylene glycol)$_m$oligo(ethylene glycol)$_n$bis(trifluoromethane sulfonyl)imido borate], (herein abbreviated as P[Li+(MEG$_m$EG$_n$ TFSIB)-] where m represents the length of the branch m and is 1–12 and n represents the length of spacer chain and is 2–14 and TFSI is bis(trifluoromethanesulfonyl)imide. The figures illustrate the effect of the length of branching ligand and the effect of spacer chain length on the conductivity of the polyanionic polymer at various temperatures.
Figure 2B:
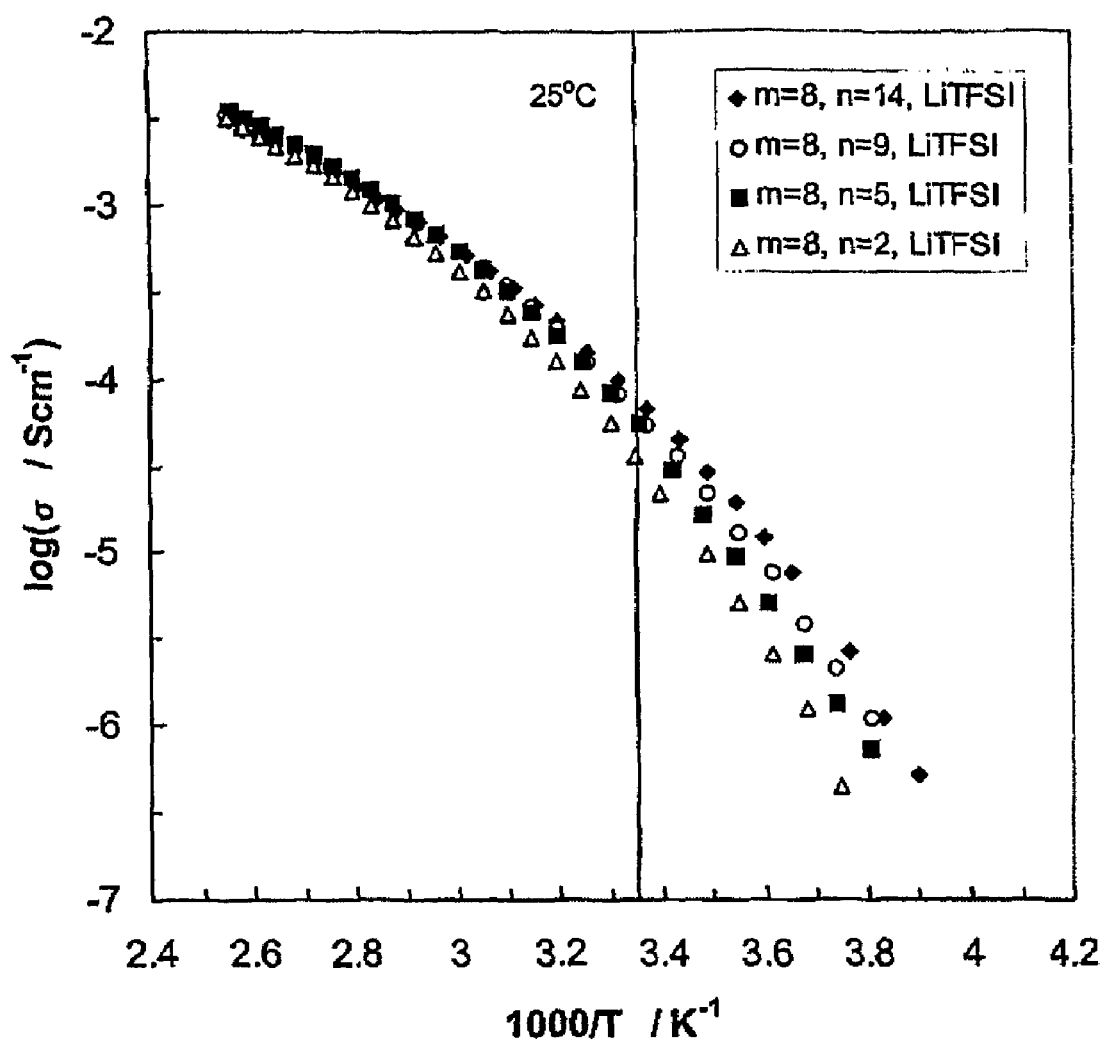
Figure 2C:
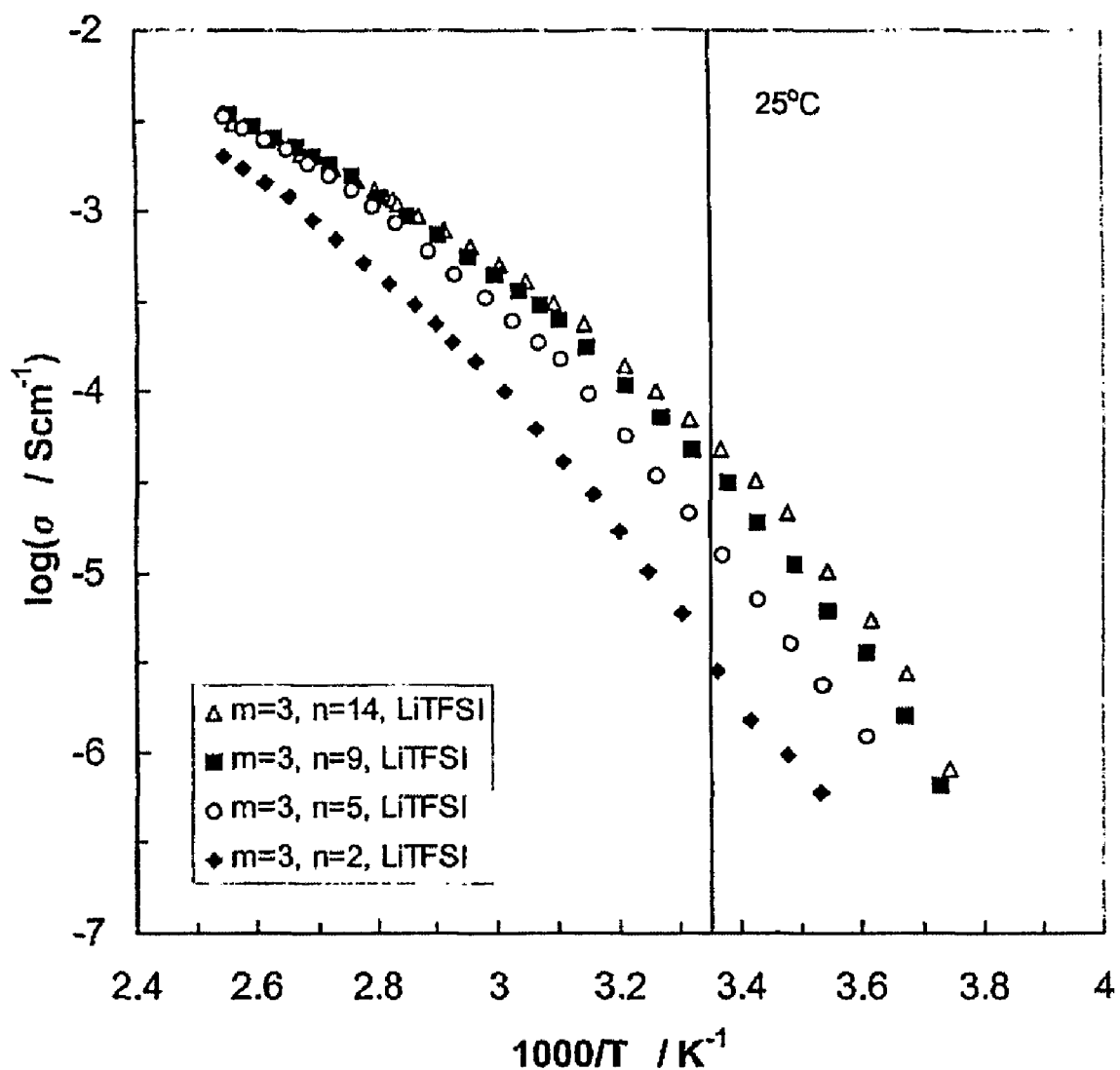
Figure 2D:
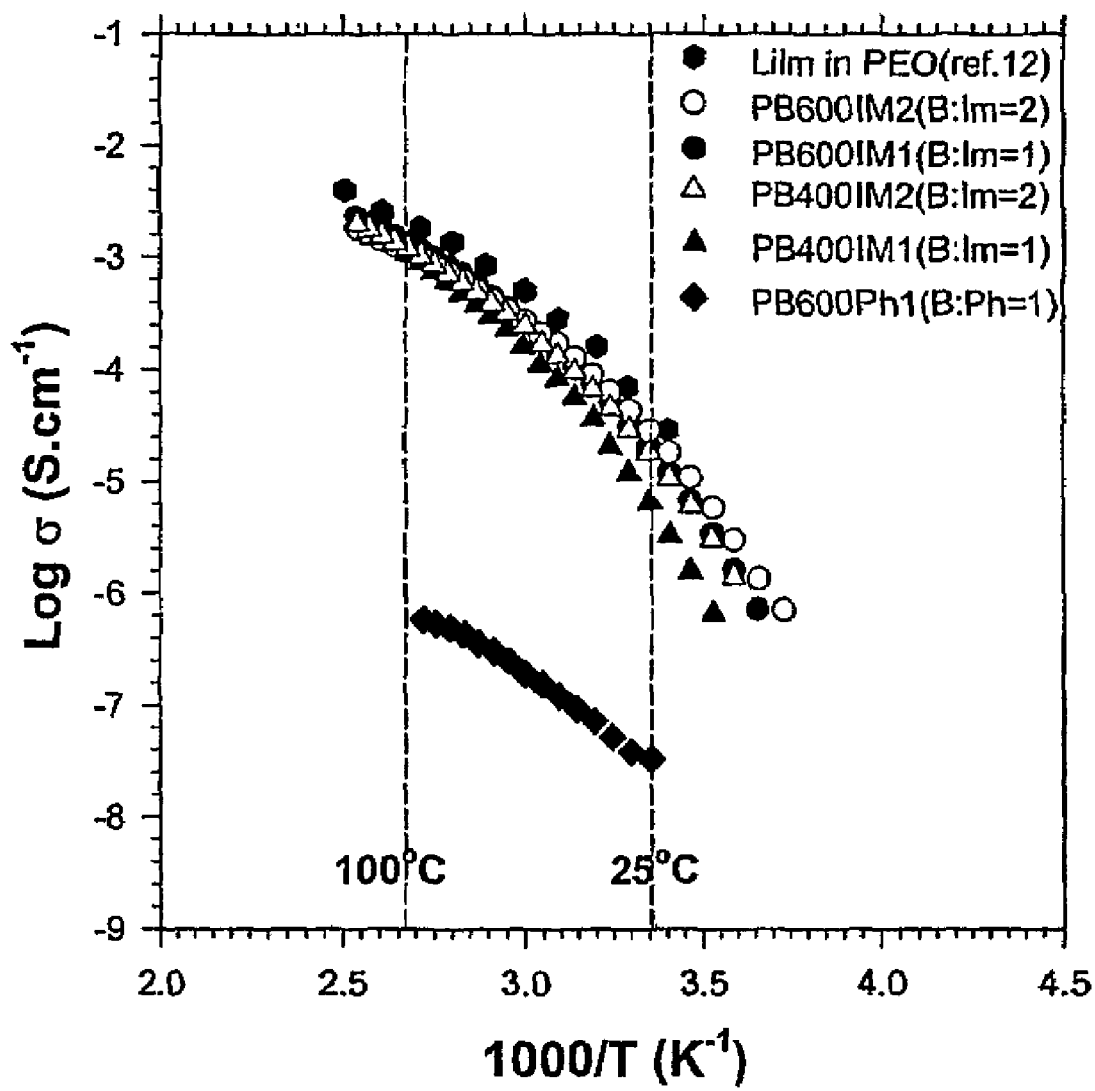
Figure 3A:
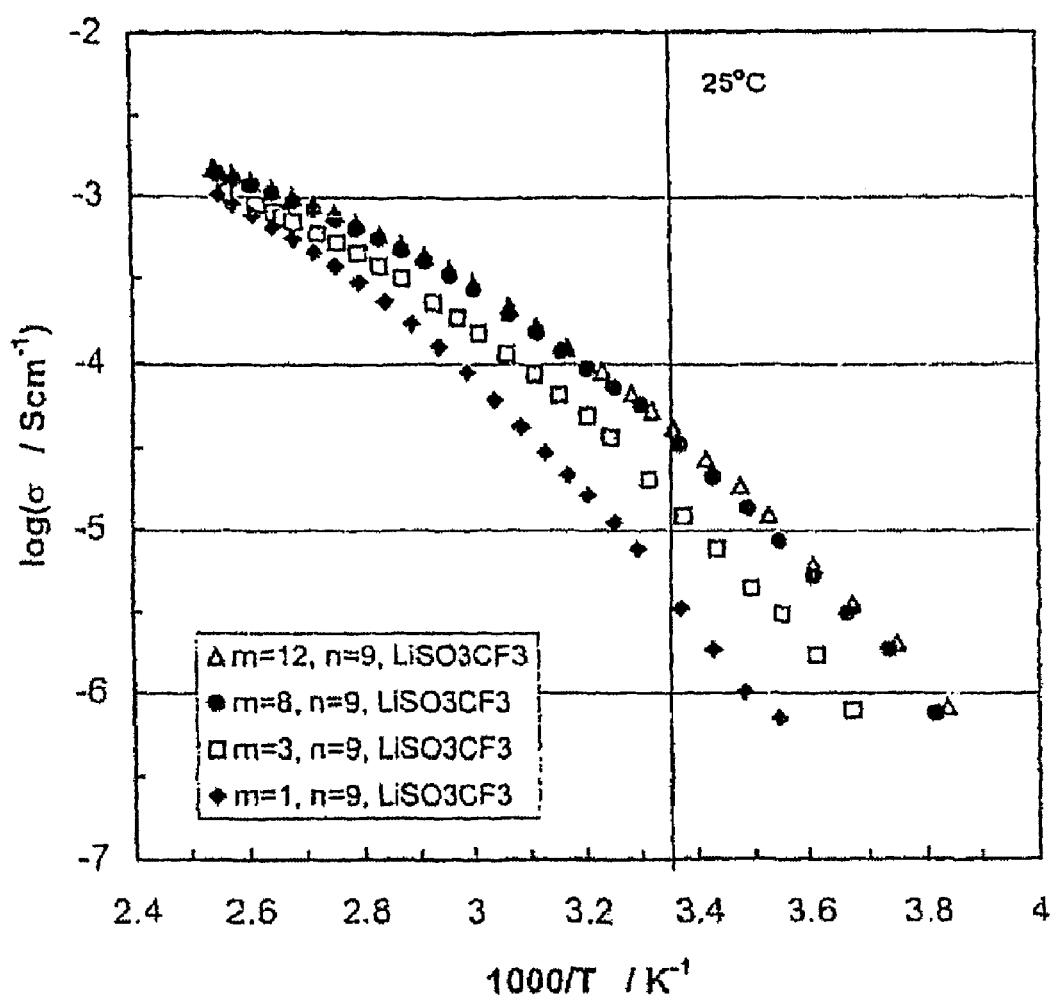

FIG. 3A illustrates the cooling curve of 1:1 (mol) P[Li(MEG$_m$EG$_n$CF$_3$SO$_3$B)] complexes wherein m is 1,3,8, or 12.

Figure 3B:
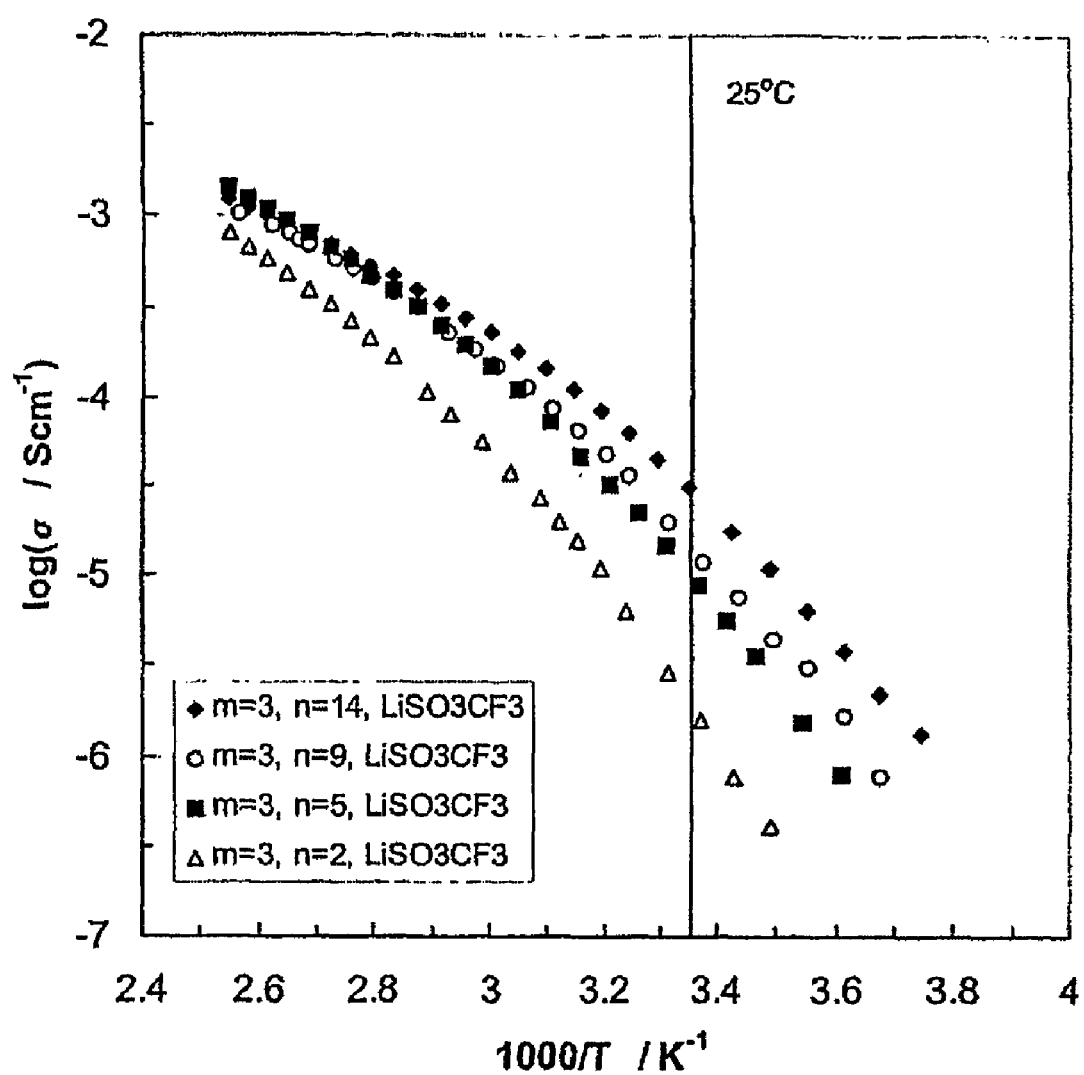

FIG. 3B illustrates the cooling curve of 1:1 (mol) P[Li(MEG$_m$EG$_n$CF$_3$SO$_3$B)] complexes wherein n is 2, 5, 9 or 14.

Figure 3C:
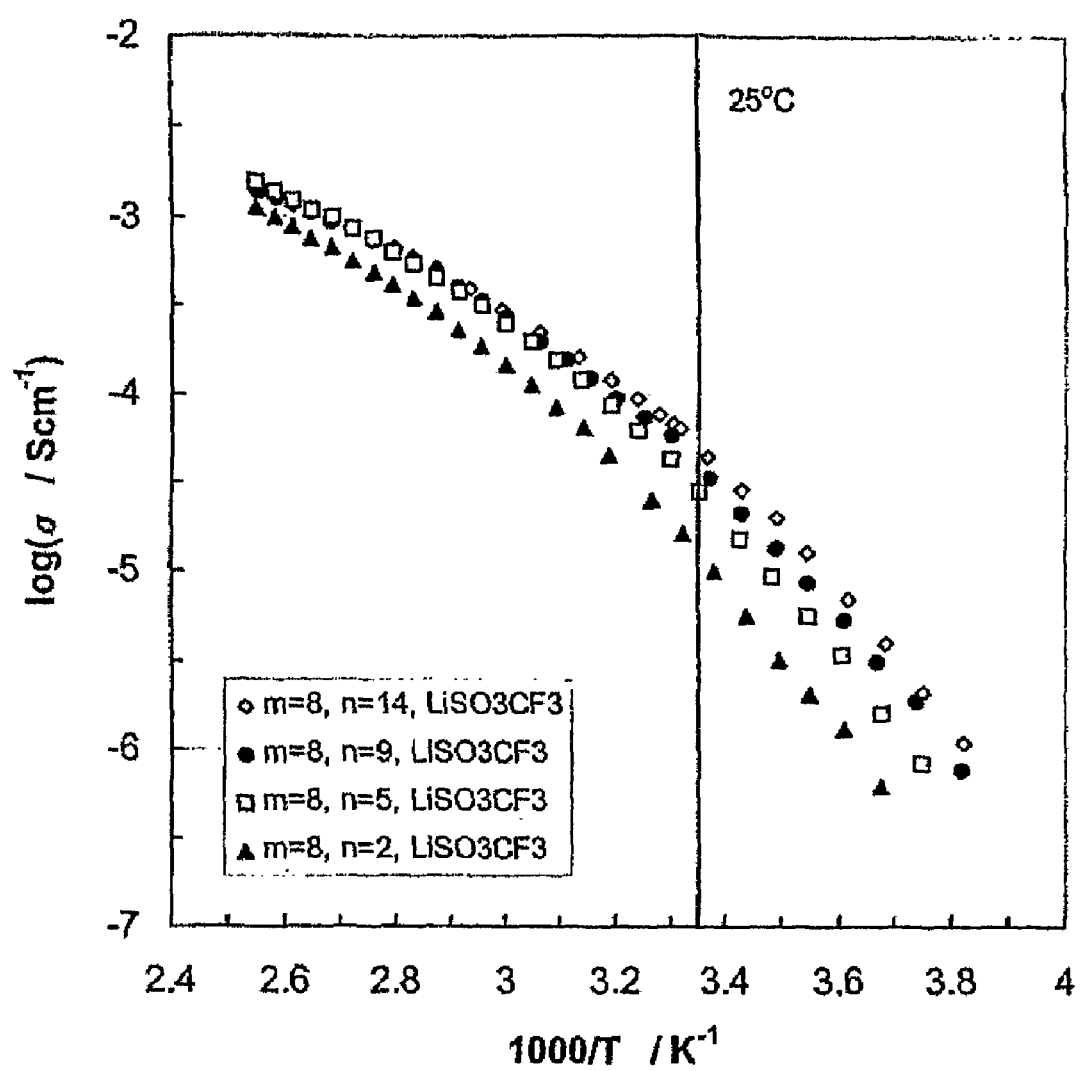

FIG. 3C illustrates the cooling curve of 1:1 (mol) P[Li(MEG$_m$EG$_n$CF$_3$SO$_3$B)] complexes wherein n is 2, 5, 9 or 14.

Figure 4:
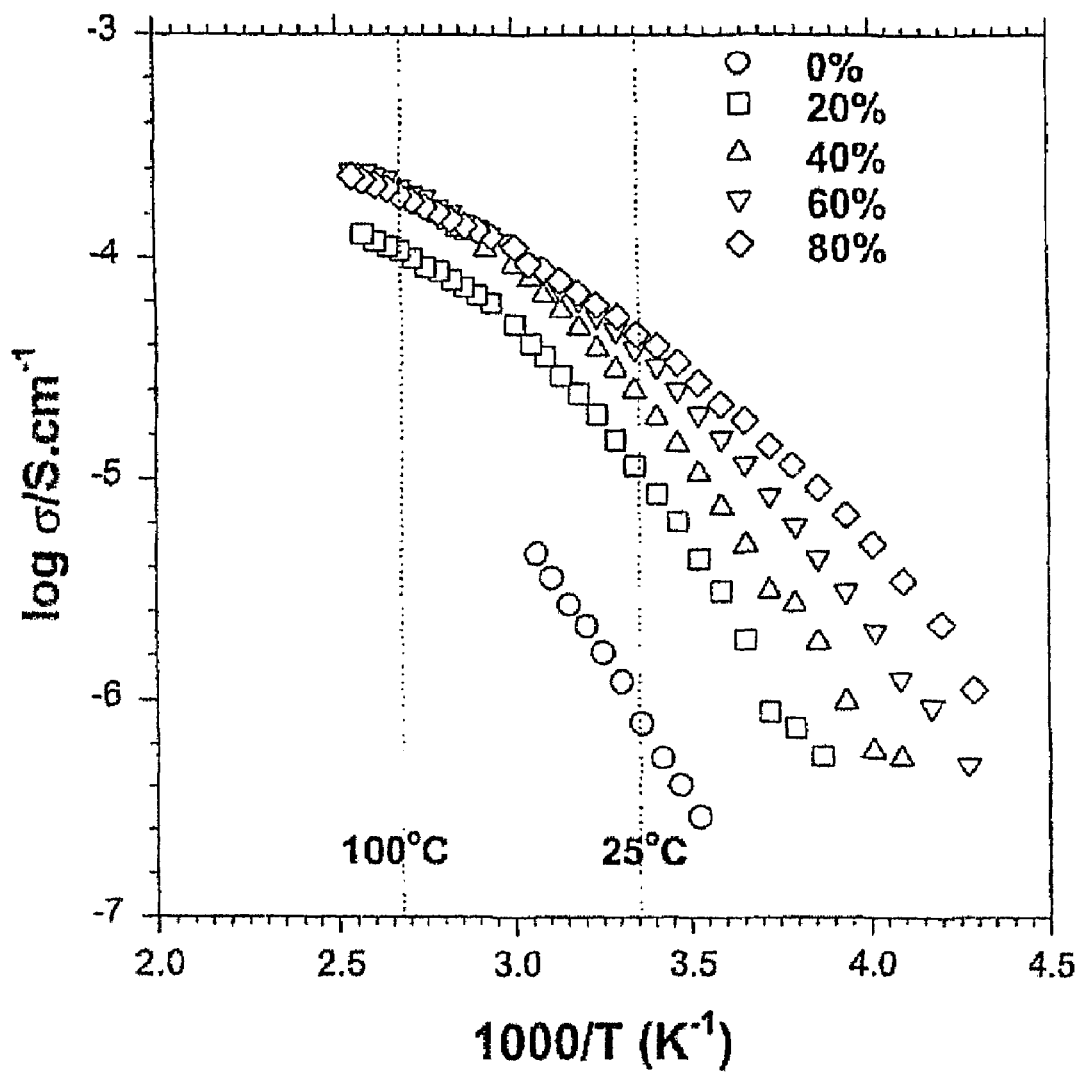

FIG. 4 illustrates the conductivity of a preferred embodiment of the present polyanionic polymer having the formula: poly{lithium[phenyl-oligo(ethylene glycol)$_{14}$cyanomethyleneborate], (herein abbreviated as P[Li(PhEG14CNCH$_2$B)] in the presence of different percentages of plasticizer (1:1 o/w ethylene carbonate/propylene carbonate) at various temperatures. This compound comprises Lewis acid borate with ligand phenyl, spacer groups ethylene glycol and the anionic Lewis base CH$_2$CN$^-$ with counterion lithium.

Figure 5:
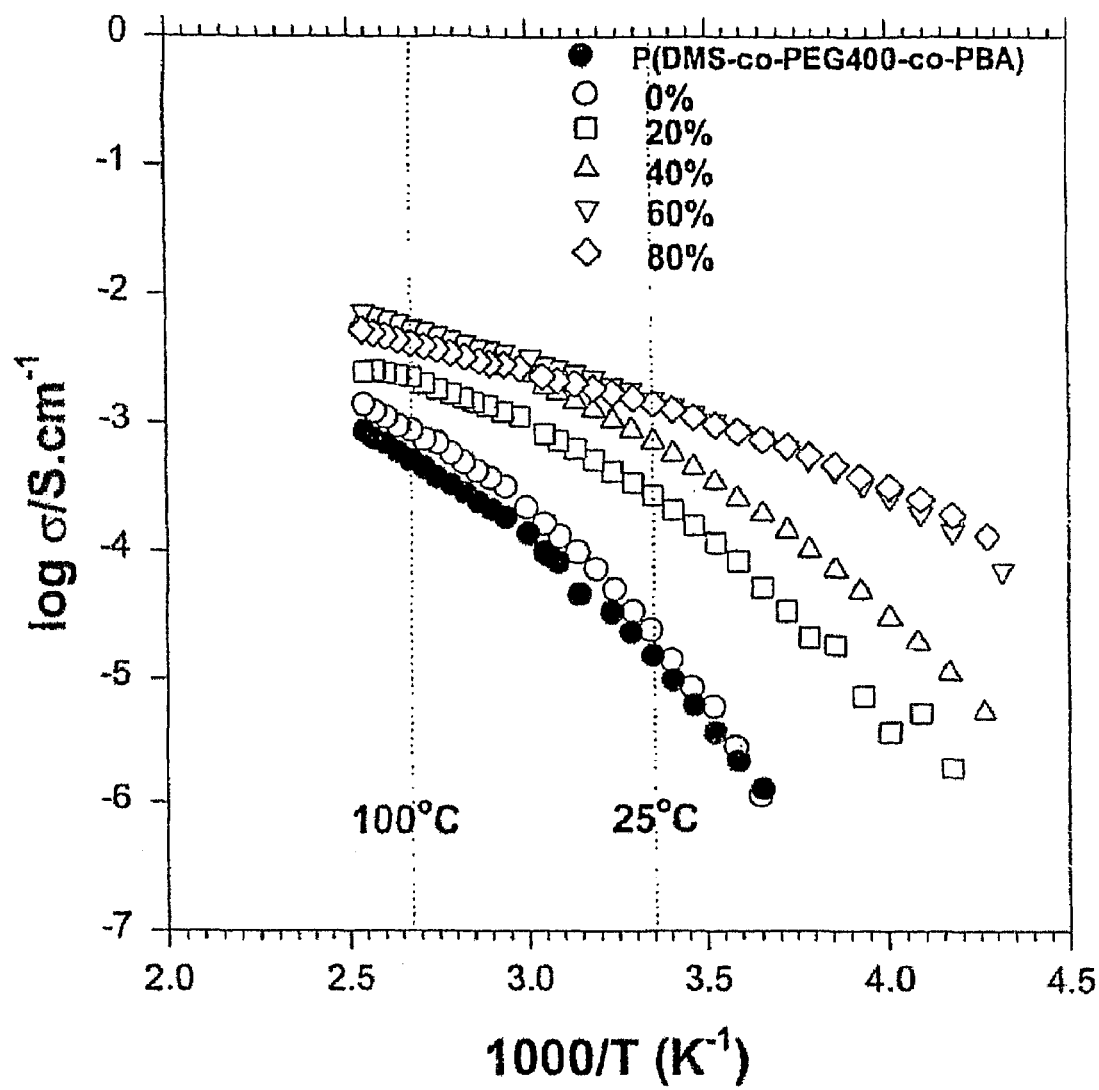

FIG. 5 illustrates the conductivity of a preferred embodiment of the present polyanionic polymer having the formula {poly{lithium[oligo((dimethyl siloxane-co-tetra ethylene glycol)-phenyl bis(trifluoromethanesulfonyl)imidoborate]} in the presence of different percentages of plasticizer (1:1 o/w ethylene carbonate/propylene carbonate) at various temperatures.

This compound comprises Lewis acid borate with ligand phenyl, spacer groups oligoether siloxane and the anionic Lewis base TFSI$^-$ and counterion lithium.

Figure 6:
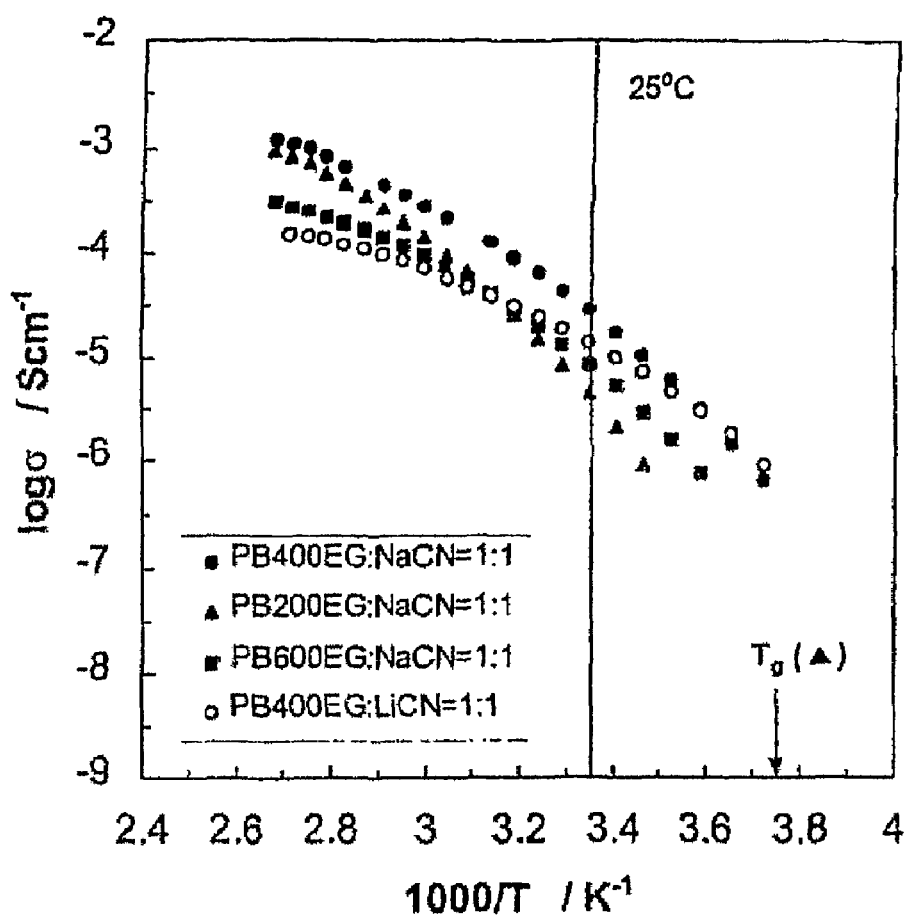

FIG. 6 illustrates the conductivity at various temperatures of preferred embodiment of the present polyanionic polymers having the formula poly {lithium[phenyl-oligo(ethylene glycol)$_n$cyanoborate]} or poly{sodium[phenyl-oligo(ethylene glycol)$_n$cyanoborate]} (herein abbreviated as P[Li (PBEG$_n$CN)] or P[NaPB EG$_n$)] wherein n is 5 (for 200), 9 (for 400), or 14(for 600)). These polyanionic polymers comprise borate with phenyl ligand and ethylene glycol spacer units of different length with the Lewis base CN$^-$ and with Na$^+$ or Li$^+$ as counterions.

Figure 7A:
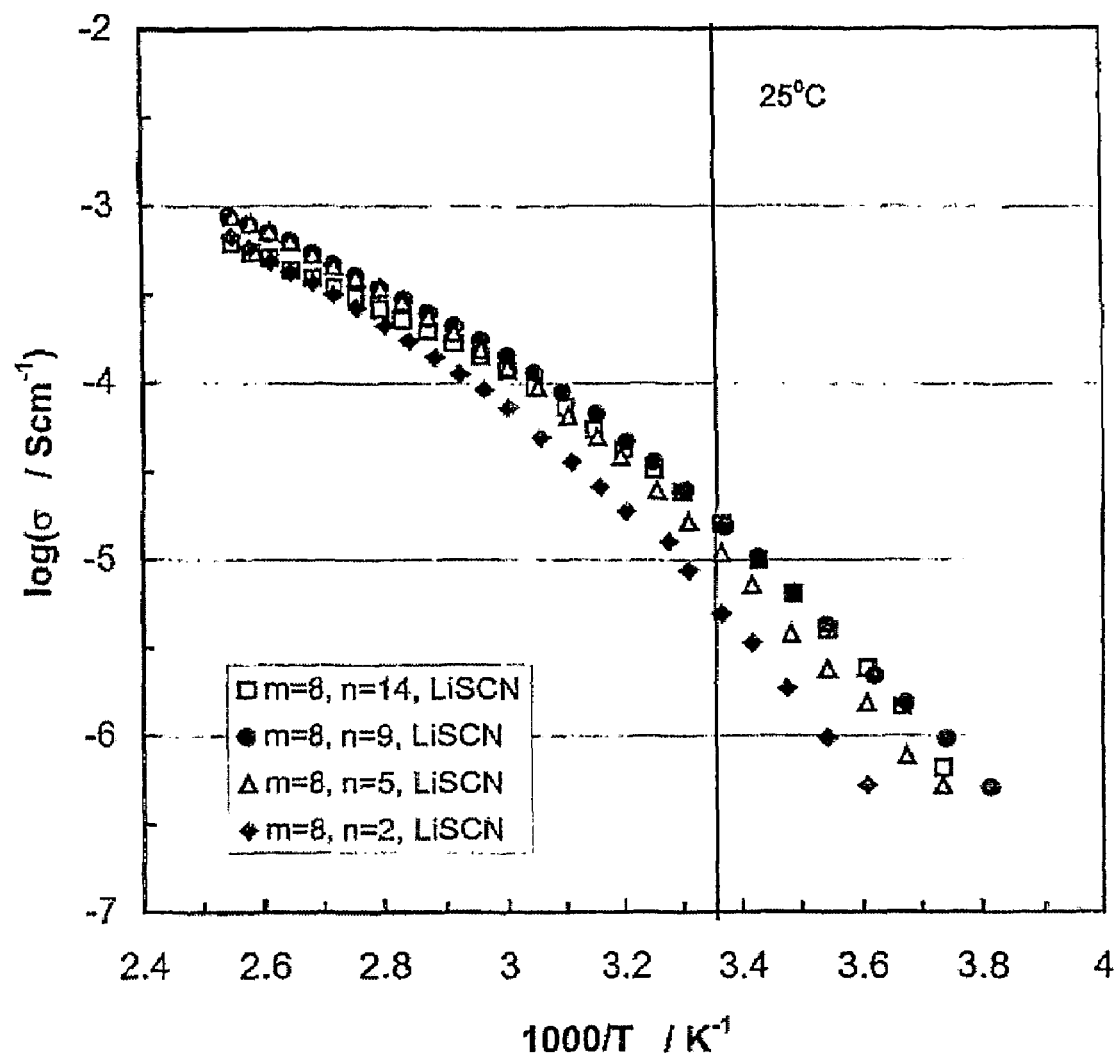
Figure 7B:
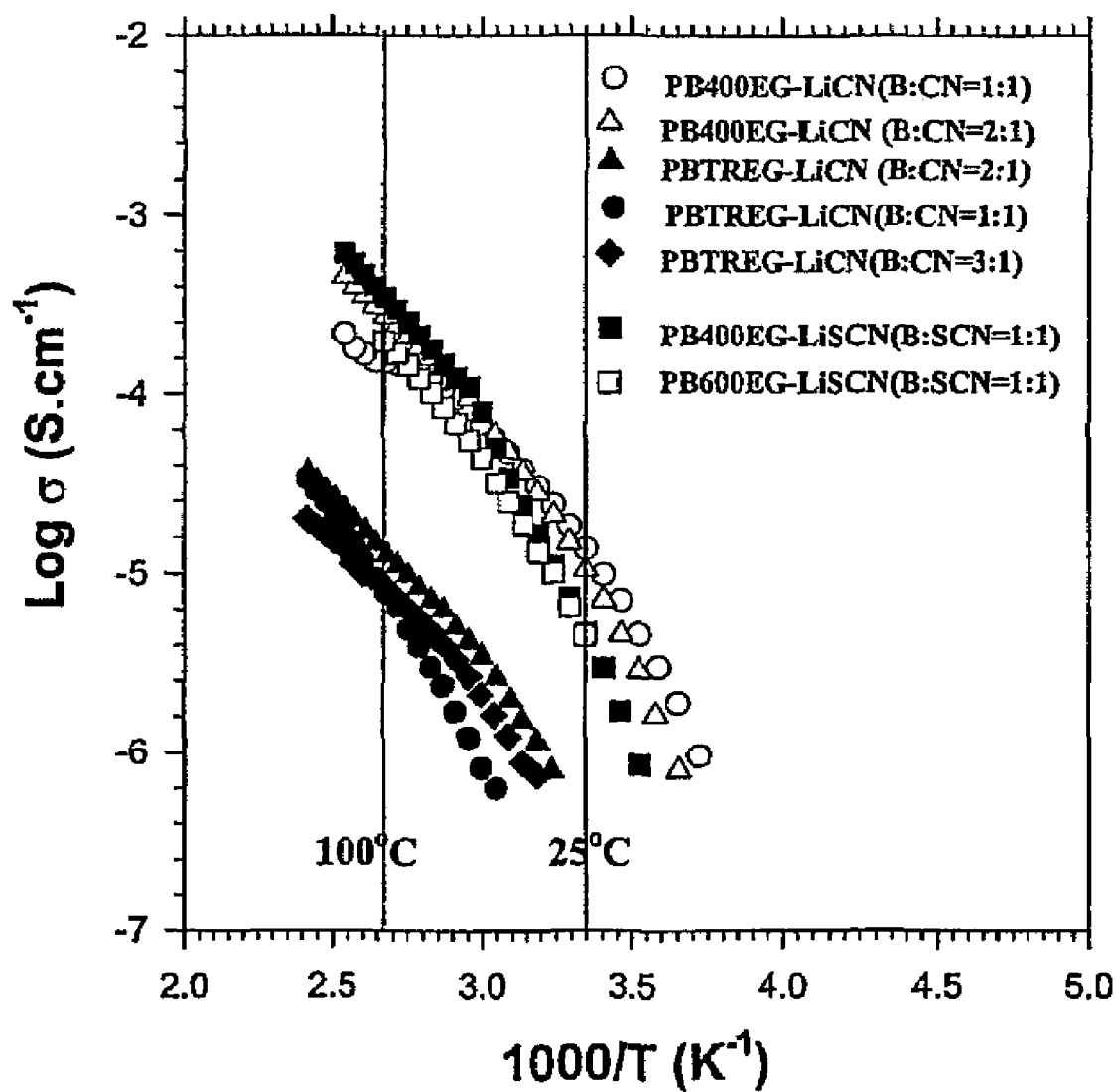

FIGS. 7A and 7B illustrate the conductivities of LiSCN complexes of Lewis-acid containing polymers wherein n is 2, 5, 9 or 14.

FIG. 7A illustrates the conductivity at various temperatures of LiSCN—P(MEG8EG$_n$B) wherein n is 2, 5, 9 or 14 with various ratio of salt to polymer.

FIG. 7B illustrates the conductivity at various temperatures of LiSCN-[phenyl-oligo(ethylene glycol)$_n$borate] at various ratios of salt to polymer wherein n=3, 5 or 7.

Figure 8:
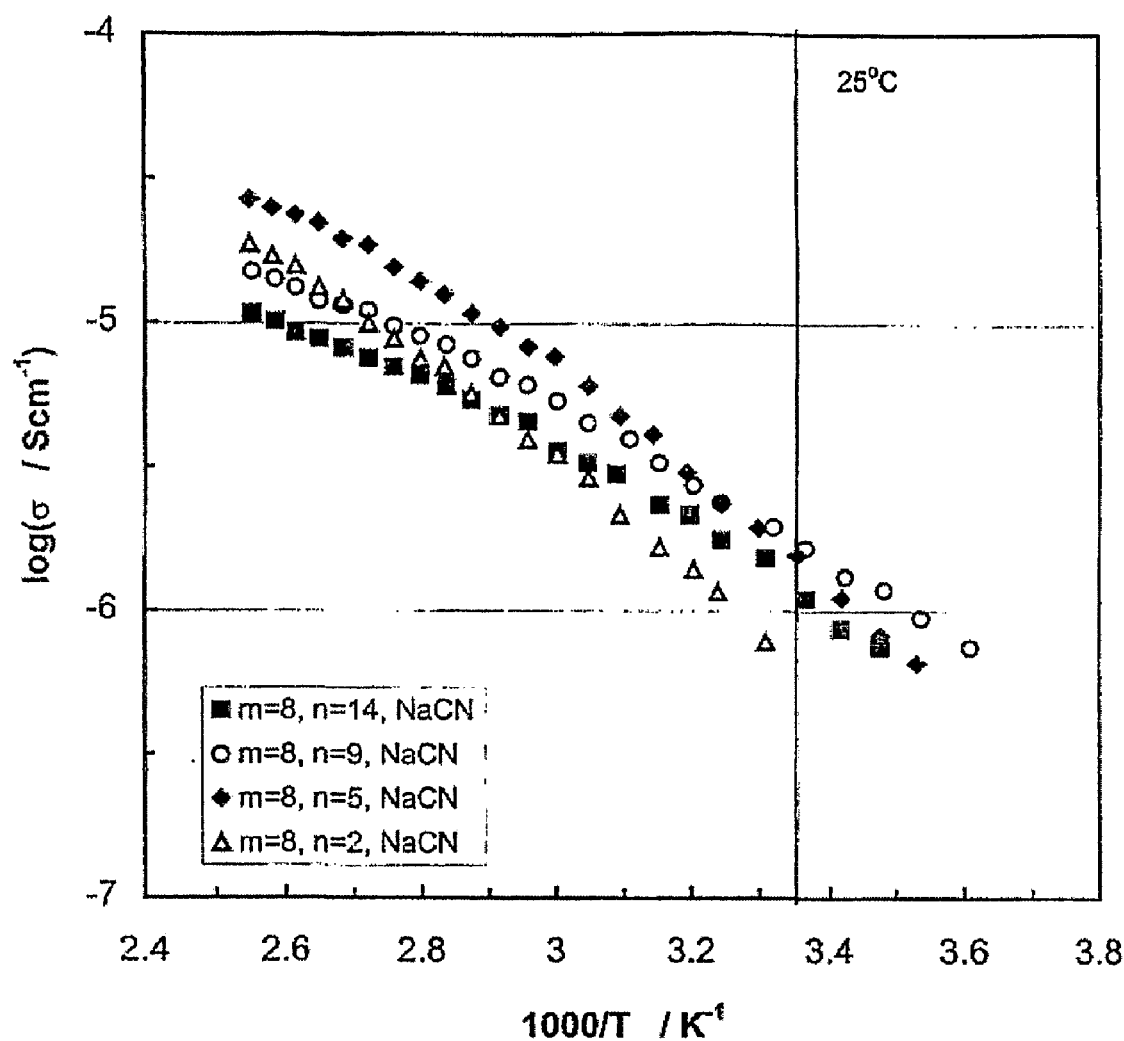

FIG. 8 illustrates the conductivity at various temperatures of NaCN—P(MEG$_8$EG$_n$B) wherein n is 3, 7 or 9 with 1:1 ratio of salt to polymer.

FIGS. 9A–9D illustrate the conductivity at various temperatures of the cross-linked polymer of LiOCH$_2$CF$_3$—P(MEG$_3$EG$_n$B) with various amounts of plasticizer and n equals 2 to 14.

Figure 9A:
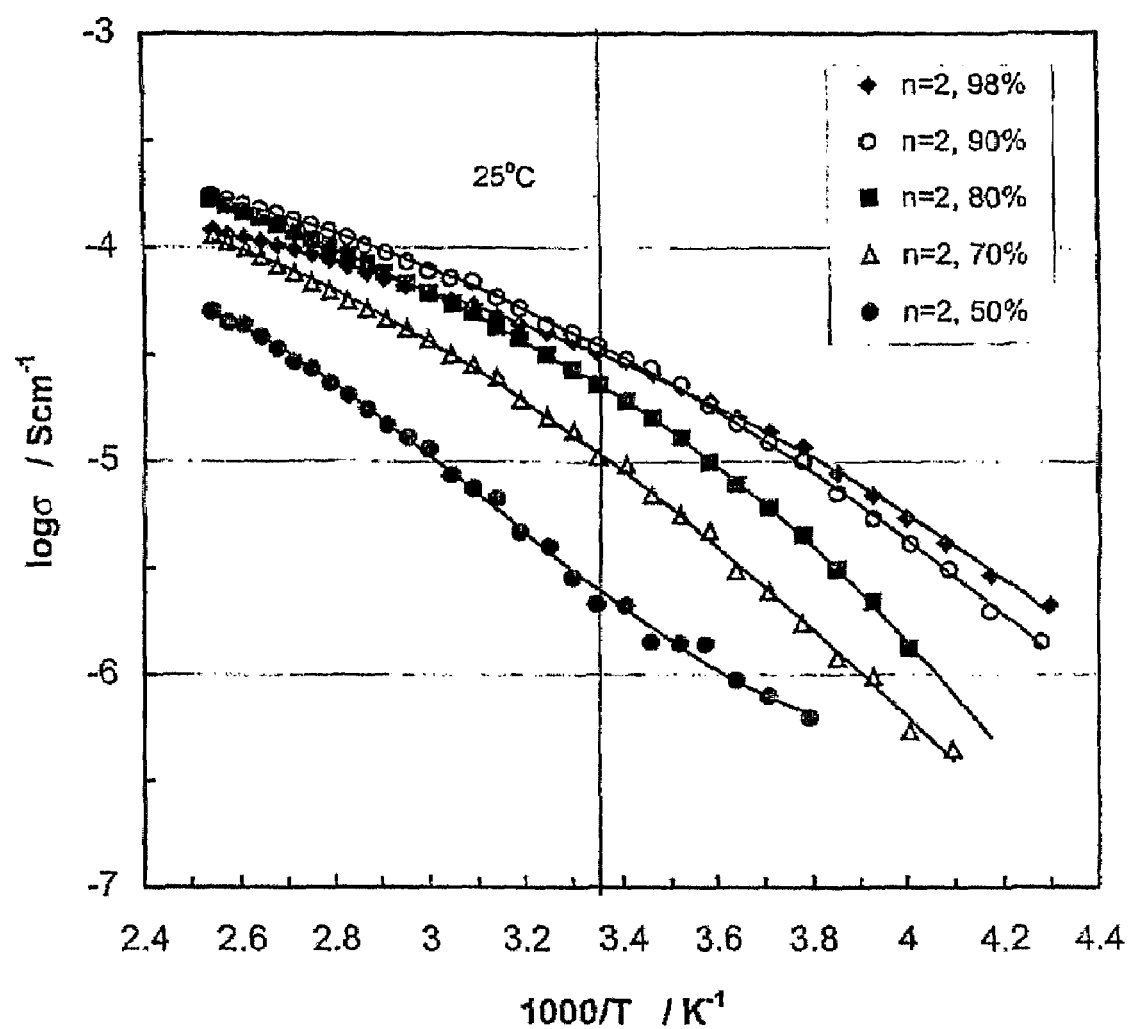
Figure 9B:
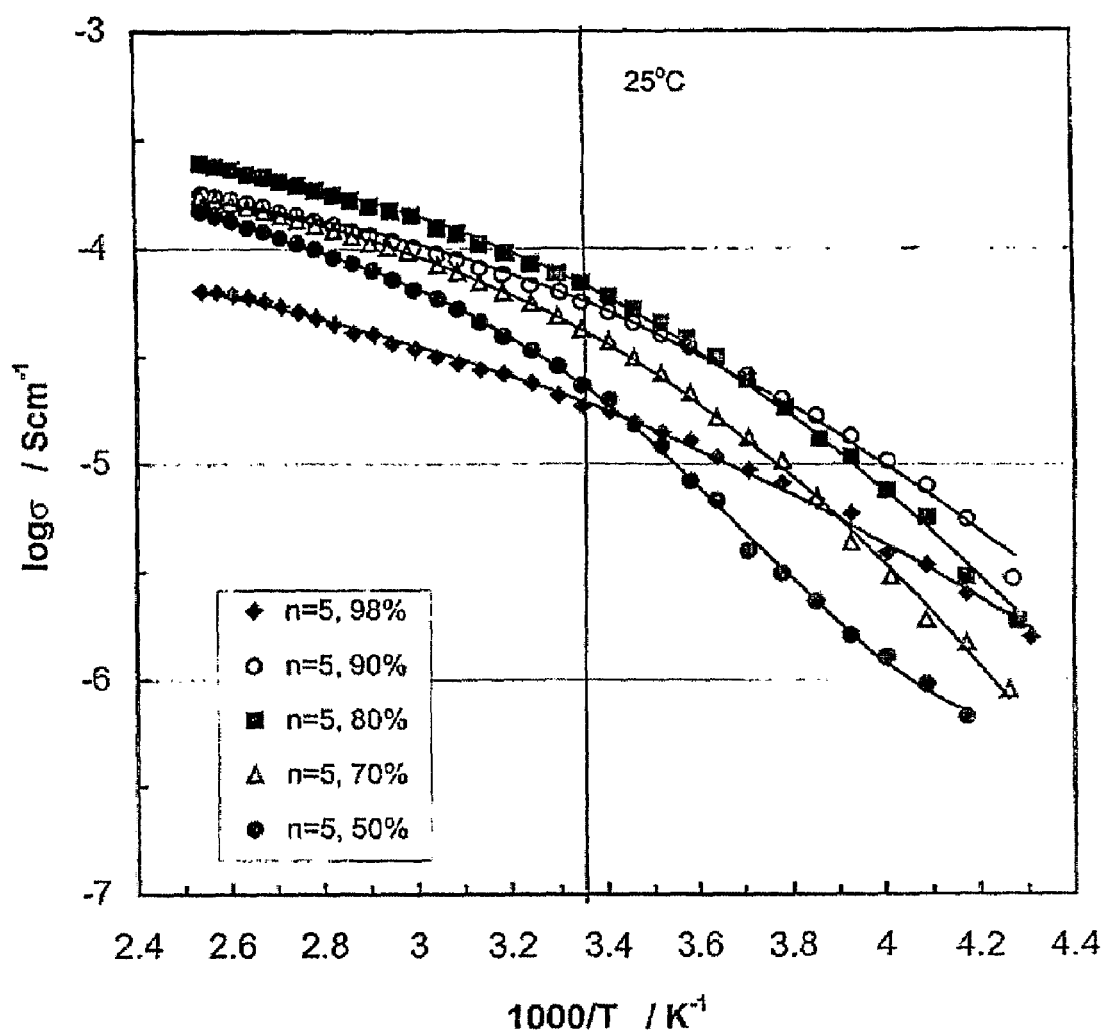
Figure 9C:
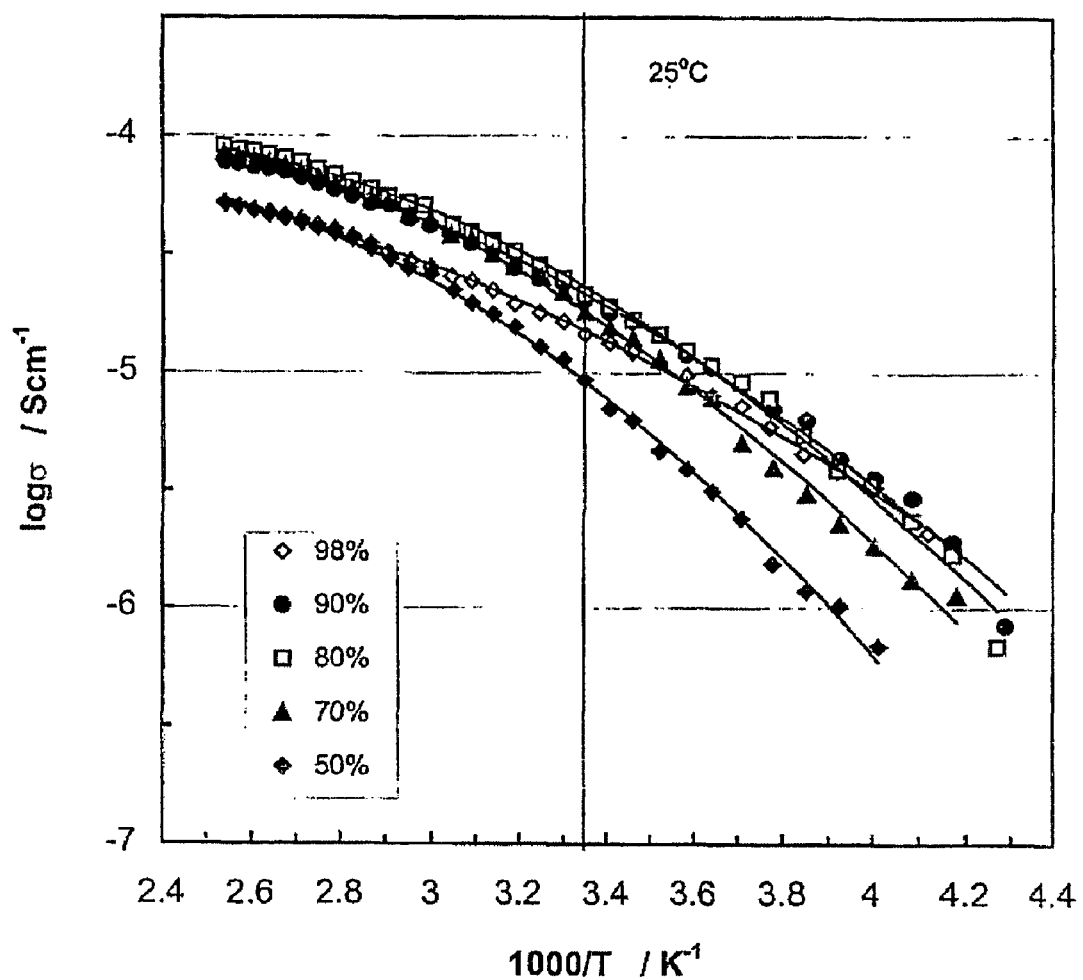
Figure 9D:
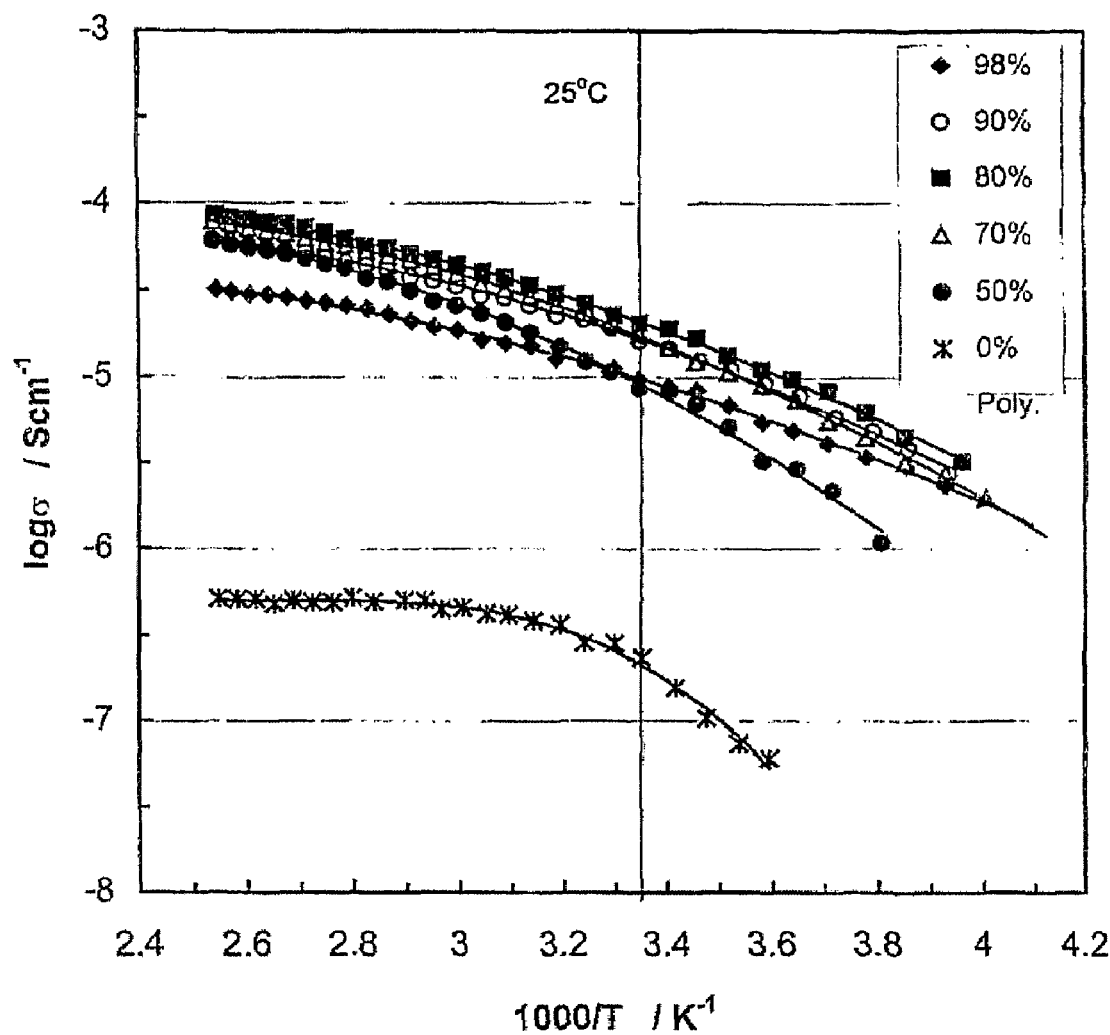

FIG. 9A illustrates LiOCH$_2$CF$_3$—P(MEG$_3$EG$_2$B.
FIG. 9B illustrates LiOCH$_2$CF$_3$—P(MEG$_3$EG$_5$B.
FIG. 9C illustrates LiOCH$_2$CF$_3$—P(MEG$_3$EG$_9$B.
FIG. 9D illustrates LiOCH$_2$CF$_3$—P(MEG$_3$EG$_{14}$B.

Figure 10A:
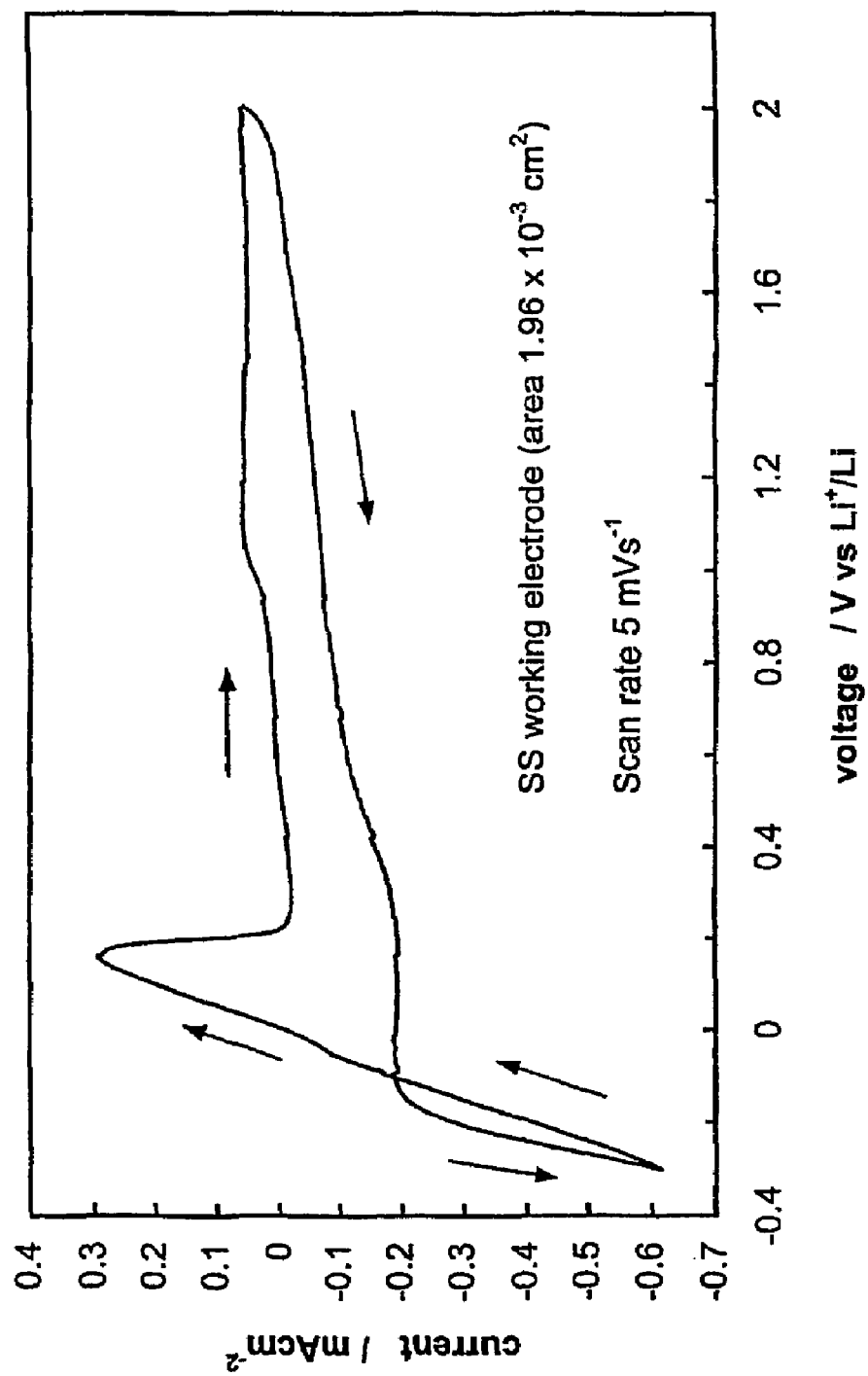
Figure 10B:
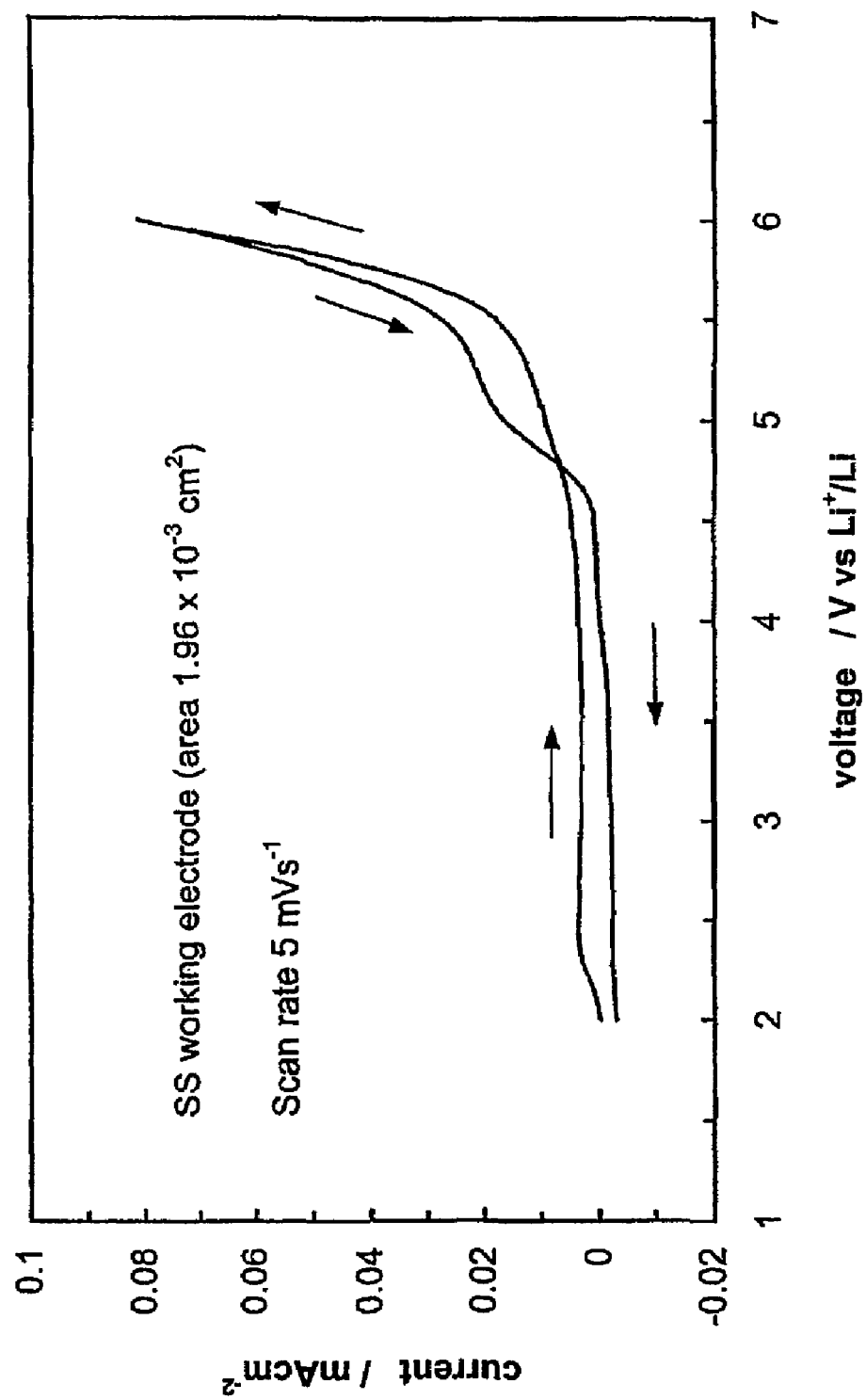

FIGS. 10A and 10B illustrate the electrochemical characteristics of the anionic polymers LiTFSI—P(MEG$_8$EG$_{14}$B).

FIG. 10A illustrates the Li deposition-stripping of 1:1 (mol) LiTFSI—P(MEG$_8$EG$_{14}$B).

FIG. 10B illustrates the electrochemical stability window of 1:1 (mol) LiTFSI—P(MEG$_8$EG$_{14}$B).

Figure 11A:
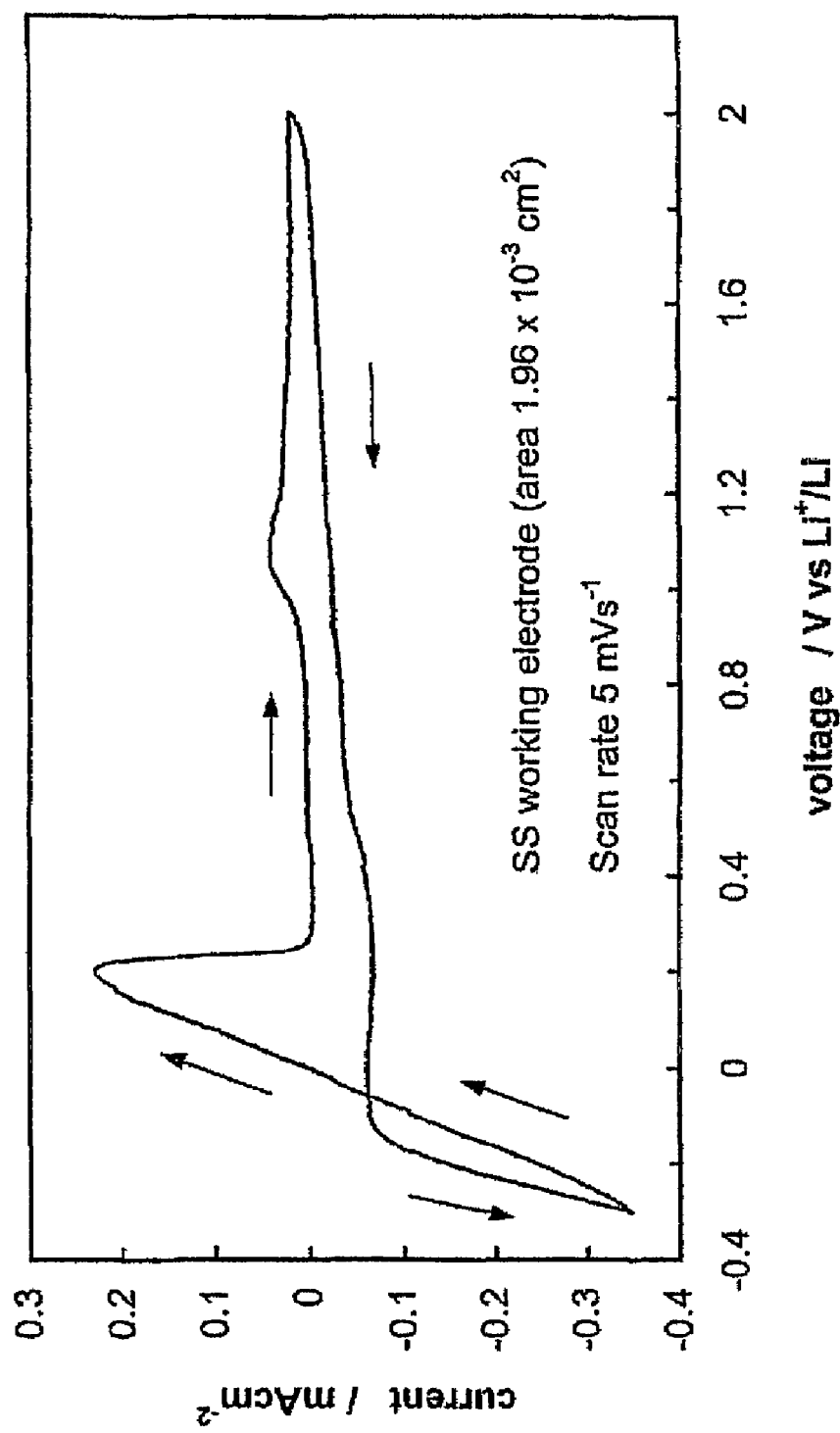
Figure 11B:
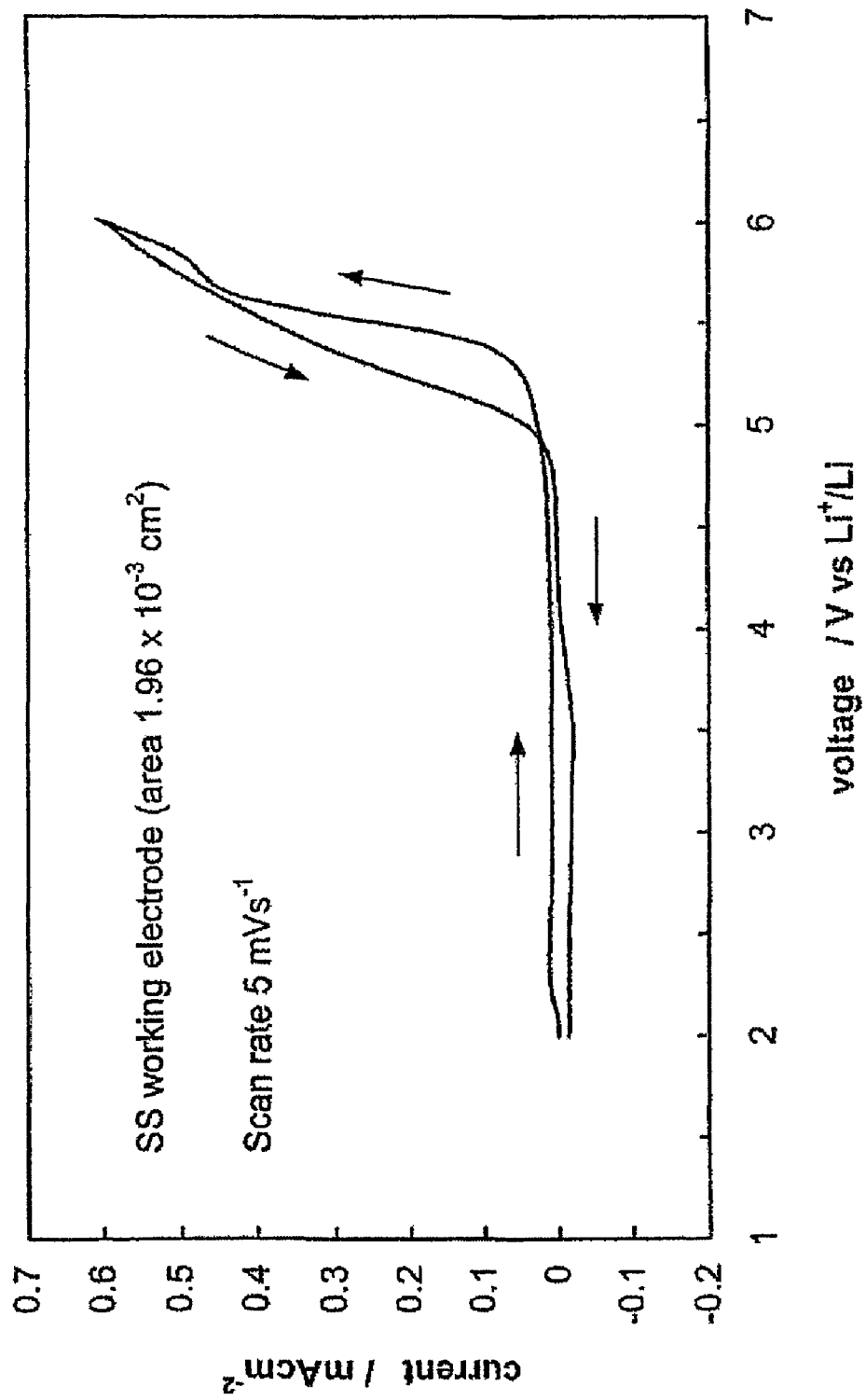

FIGS. 11A and 11B illustrate the electrochemical characteristics of the anionic polymers LiSO$_3$CF$_3$—P(MEG$_8$EG$_{14}$B).

FIG. 11A illustrates the Li deposition-stripping of 1:1 (mol) LiSO$_3$CF$_3$—P(MEG$_8$EG$_{14}$B).

FIG. 11B illustrates the electrochemical stability window of 1:1 (mol) LiSO$_3$CF$_3$—P(MEG$_8$EG$_{14}$B).

DESCRIPTION OF PREFERRED EMBODIMENTS

Novel polymeric compositions incorporating Lewis acids are provided wherein the Lewis acids comprise a Group III element and three ligands bound to the Group III element. The Lewis acid groups are positioned in the polymer chain by means of spacer groups of determined length and structure. Methods for forming the Lewis-acid polymers are given. The polymers find use as precursors in the formation of conductive polyanionic polymers.

Polyanionic polymers are provided which exhibit high conductivity. They are prepared by combining the Lewis acid-containing polymers with certain salts of a Lewis base. The resultant polymers comprise polyanionic groups whose strength of attraction for counterion is dependent on the bonding strength between the Lewis acid group and the chosen Lewis base. Polyanionic polymers prepared by addition of an anionic Lewis base which associates weakly with the Lewis acid-containing polymers to form weakly coordinating anionic groups and exhibit good decoupling and good conductivity are provided. Certain other polyanionic polymers formed by addition of an anionic Lewis base which binds strongly to the Lewis acids to exhibit weak decoupling and hence relatively poor, but strictly single ion, conductivity, but good ion transport, are provided. Compounds with intermediate bonding strengths are also provided.

The anionic polymers can be modified by the addition of plasticizers, co-polymers and by cross-linking to make a polyanionic polymeric network. The modified polyanionic polymers can be formed into films and find use as electrolytes in electrochemical devices employing lithium batteries.

The Lewis acids in the present polymers comprise a Group III element, preferably boron or aluminum, most preferably boron. A Lewis acid is defined as a group, which is capable of accepting electrons in a chemical reaction. As may be observed by their position in the periodic chart, the Group III elements contain 3 electrons in their outer orbits, and so even after bonding to three ligands (total 6 electrons), they still have the capacity to accept another ligand. The Lewis acid groups will, for the most part, be tri-coordinated boron groups wherein two ligands are oxygen atoms or other functional groups capable of linking the central Group III element into the polymer chain.

In preferred embodiments, two oxygen atoms chemically link the Lewis acid group into the backbone of the polymer chain. The third ligand in some instances is phenyl, substituted phenyl, preferably 2,4-difluorodiphenyl or 3,5-diflurodiphenyl, alkyl, substituted alkyl or alkoxy. As used herein, the term "substituted" means halo, alkyl, alkoxy or phenyl.

In certain preferred instances the ligand on the Lewis acid group, preferably a borate, is alkoxy-oligo(alkene glycol)$_m$ (hereinafter termed XG$_m$), preferably methoxy-oligo(ethylene glycol)$_m$(hereinafter termed MEG$_m$) or butoxy-oligo(propyleneglycol)$_m$(hereinafter termed BPG$_m$) wherein m is 1–45.

The present polymers comprise repeating units of Lewis acids separated by polymer chain groups. The polymer chains in turn comprise repeating spacer groups which may be the same or different in each occurrence. The number, length and structure of the spacer groups determine the intervals between the Lewis acid groups in the polymer chain. They also determine the flexibility of the chains and the mechanical strength and other physical characteristics of the polymer. The spacer groups may be chosen to provide optimal physical characteristics to the polymer. The spacing of the weakly coordinating anionic moieties in the polymers at regular, determined intervals in the polymer chain gives them a consistency of electrical and mechanical characteristics that may not be obtainable in simple mixtures. In certain instances the spacer groups are polyethers, preferably repeating groups of polyethylene glycol (hereinafter termed (EG)$_n$ or polypropylene glycol (hereinafter termed (PG)$_n$). Other ethers may likewise be employed.

In certain other instances the spacer groups are polysiloxanes having the formula $Si[(CR_3)_2]-O(CR_2CR_2O)_n$. Other chemical groups that can be linked to the Lewis acid group by the method of the present invention are likewise suitable spacer groups. In certain instances the spacer groups comprise a chemical group suitable for causing further reaction of the polymer chain with other polymers or with a solid surface—a chromatography bead, for example.

Table 1 illustrates the effect of the nature and length of the spacer groups and the ligand on the physical state and appearance of Lewis acid-containing polymers wherein the Lewis acid group is a borate bound to a ligand comprising branching groups MEG$_m$ or BPG$_m$ having different repeat values m. In these examples, the spacer groups are oligo(ethylene glycol) (EG$_n$) or oligo(polyethylene glycol) (PG$_n$) having different repeat values of n.

TABLE 1

APPEARANCE OF LEWIS ACID-CONTAINING POLYMERS HAVING THE FORMULAE a. poly[methoxy-oligo(ethylene glycol)$_m$ oligo(ethylene glycol)$_n$ borate], where m represents the length of the branch and is 1, 3, 8 or 12 and n represents the length of spacer chain and is 2, 5, 9, or 14. This compound is herein abbreviated as P(MEG$_m$EG$_n$B).
b. poly[methoxy-oligo(ethylene glycol)$_m$ oligo(propylene glycol)$_n$ borate] where m represents the length of the branch and is 8 and n represents the length of spacer chain and is 13. This compound is herein abbreviated as P(MEG$_m$PG$_n$B).
c. poly[butoxy-oligo(propylene glycol)$_m$ oligo(propylene glycol)$_n$ borate], where m represents the length of the branch and is 5 and n represents the length of spacer chain and is 9. This compound is herein abbreviated as P(BPG$_m$EG$_n$B).

| Branch type (Y$_1$) | Spacer type (Z) | Brach length (m) | Spacerlength (n) | Appearance |
|---|---|---|---|---|
| MEG | EG | 1 | 9 | Gel (brittle rubber) |
|  |  | 3 | 2 | Gel (brittle rubber) |
|  |  |  | 5 | Soft rubber |
|  |  |  | 9 | Rubber |
|  |  |  | 14 | Rubber |
|  |  | 8 | 2 | Viscous liquid |
|  |  |  | 5 | Viscous liquid |
|  |  |  | 9 | Very viscous liquid |
|  |  |  | 14 | Very viscous liquid |
|  |  | 12 | 9 | Very viscous liquid |
|  | PG | 8 | 13 | Very viscous liquid |
| BPG | EG | 5 | 9 | Rubber |

The Lewis acid polymers of the subject invention will have one of the formulae:

wherein

A is a Lewis acid group having the formula

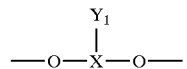

wherein X is a group III element;

Y$_1$ is a ligand bound to X;

O is a ligand bound to X and to the polymer chain L;

L is a polymeric chain chemically linked to a ligand in said Lewis Acid and wherein L comprises a determined number of spacer groups and has the formula:

$L=(Z)_n$ wherein
Z is a spacer group; and
n is the number of each said spacer groups
and wherein Z is the same or different in each occurrence; and
p is the number of repeat units in the polymer.

In preferred embodiments of the Lewis-acid containing polymer,

X is aluminum or boron, most preferably boron.

The ligand $Y_1$ is selected from the group comprising phenyl, substituted phenyl, alkyl, substituted alkyl, alkoxy and substituted alkoxy. As used herein, the term "substituted" means halo, alkyl, alkoxy, alkylene glycol, or phenyl. Most usually $Y_1$ is phenyl, fluoro-substituted phenyl preferably 2,4-difluorophenyl or 3,5-difluorophenyl, and $CH_3$. In certain preferred instances, $Y_1$ is alkoxy-oligo(alkylene glycol) and preferrably methoxy-oligo(ethylene glycol)$_m$ or butoxy-oligo(propylene glycol)$_m$ wherein m is 1–45.

Z is preferably chosen from the group comprising alkyl, R-substituted alkyl, alkoxy and R-substituted alkoxy wherein R is selected from the group comprising hydrogen, halo, alkyl, alkoxy, phenyl and substituted phenyl. In other instances, Z is a polysiloxane having the formula $Si[(CR_3)_2]—O(CR_2CR_2O)_n$ wherein n is independently 2 to about 50, preferably 2 to about 20, and R is hydrogen or alkyl.

Z most preferably is a polyether having the formula $[(O(CR_2)_aCR_2]_n$ wherein n is from 2 to about 100, most preferably 2 to about 20, a is zero to about 20 and R is hydrogen, halo, alkyl or R-substituted alkyl wherein R is halo, alkyl or phenyl.

p is a number from about 1 to about 100.

In these preferred embodiments the ether groups may be the same or different in each occurrence.

The same symbol may be present a plurality of times, each of the incidents may be the same or different.

In certain preferred embodiments of the Lewis Acid-containing polymers, X is boron, $Y_1$ is phenyl, alkyl or alkoxy, most preferably poly[methoxy-oligo(ethylene glycol)$_m$ or poly[butoxy-oligo(propylene glycol)$_m$ wherein m is 1–20 and spacer groups are $(OCH_2CH_2)_n$ wherein n is from 1 to about 25. In these preferred embodiments, m is about 1–45 and the repeat unit has a molecular weight up to about 2000.

The subject Lewis acid-containing polymer may be prepared by contacting a Lewis acid group comprising a Group III element coordinated to three ligands with a polymer having a reactive group capable of combining with at least one, most preferably two, of said ligands under conditions whereby the ligand and the reactive group react to form the Lewis acid-containing polymer and a small molecule. In preferred methods for forming Lewis acid-containing polymers comprising borate, a starting material may be a commercially available boronic acid such as phenyl boronic acid or methyl boronic acid (Aldrich Chemical Company). The substituted boronic acid is contacted with a chain polymer having repeat spacer groups preferably polyether groups and having reactive hydroxyl groups. In this preferred method, a chain polymer which comprises repeat units of phenyl- or alkyl-substituted boron and the spacer groups bound to oxygen groups on the boron is formed, and the small molecule which is formed is water.

In other instances the substituted boronic acid may be prepared from boric acid and then this substituted boronic acid is further reacted with a suitable spacer group. In these instances, novel ligands may be prepared which are chosen to have desired chemical properties to affect the electron density of the Lewis acid and the resultant Lewis acid-containing polymer. In a preferred embodiment, polymers may be prepared by combining un-substituted Lewis acid, preferably boric acid, with an ether group with one terminal reactive hydroxyl group and one terminal alkoxyl group to form a boronic acid, and then reacting the substituted boronic acid with a poly(alkylene glycol) spacer group. The resultant polymer comprises a tri-substituted borate group wherein one ligand is an alkoxy group of the formula-$(OCR_2CR_2)_nOCR_3$ wherein R is hydrogen or alkyl and the other two ligands are spacer groups of the formula —$(OCR_2CR_2)_n$ wherein n is 1–50, preferably 1–20 and most preferably 3, 5, 9 or 14.

It is to be understood that in those instances herein, wherein n is given an integral value, it may be that the actual repeat value is somewhat less or more, but the integral value is reported for convenience. Thus, e.g. when n is 14, the actual value maybe about 13.6.

Certain other boronic acids that are suitable Lewis acids in the present method comprise alkyl and R-substituted alkyl wherein R is alkyl, ether, phenyl or halo. In these preparations, reaction conditions are controlled to allow mono-ligand formation and to assure that two remaining hydroxyl borate groups remain available for subsequent combination with spacer groups.

The Lewis acid-containing polymers are precursors in the formation of conductive polyanionic polymers of the present invention. The subject polyanionic polymers are prepared by adding a salt of a Lewis base to the Lewis acid-containing polymer. In the reaction, the anionic Lewis base, which is defined as a chemical group capable of donating electrons in a reaction, combines with under-coordinated Lewis acids in the polymer. In those instances wherein the Lewis acid-containing polymers comprise borate, the anionic Lewis base combines with under-coordinated boron in the Lewis acid group and essentially becomes the fourth ligand. A polyanionic polymer results.

In certain instances, the anionic Lewis base may bind strongly to the Lewis acid moiety and will produce a polyanionic polymer which has relatively poor conductivity, but high Li$^+$ transport number (close or equal to unity). In other instances, the Lewis base may associate weakly with the Lewis acid and produce a polymer which has good conductivity but lower Li$^+$ transport number. The Lewis base used to make the polyanionic polymer may be chosen to produce the product desired. For application as polymeric electrolytes in lithium batteries, the main parameters to consider are high conductivity, wide electrochemical stability window (>4.5 V) and mechanical strength. The lithium ion transport number is also important for this application, and the higher the better.

Polyanionic polymers prepared from the Lewis acid polymers have one of the formulae:

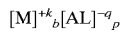

wherein
AL is a repeat unit in the chain wherein:
A is an anionic group comprising a Lewis acid bound to or associated with a Lewis base and having one of the formulae:

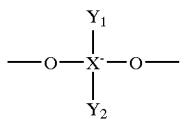

wherein X is a Group III element;
Y$_1$ is a ligand bound to X;
Y$_2$ is a ligand bound to X or associated with X wherein Y$_1$ and Y$_2$ and are the same or different in each occurrence;
L is a polymeric chain group chemically linked to oxygen in said anionic group and wherein L comprises a determined number of spacer groups and has the formula:

L=(Z)$_n$ wherein
  Z is a spacer group; and
  n is the number of each said spacer groups and wherein Z is the same or different in each occurrence; and
p is the number of repeat units in the polymer.
q is the charge on the anion;
M$^+$ is a cation or cationic group;
b is the number of cations;
k is the charge on the cation; and
bk equals pq.

The counterion M$^{+k}$ is a cation or a cationic group selected from the group comprising hydrogen, Group I metals, Group II metals, NR$_4$ and PR$_4$ wherein R is hydrogen, alkyl, or halo, and k is one to three. In certain instances wherein the polyanionic polymer is used as an electrolyte in a lithium battery, the counterion is most favorably lithium. In those embodiments wherein the polyanionic polymer is incorporated into an ion exchange system, the cation is preferably a Group I metal or Group II metal, most preferably sodium, potassium, and calcium. FIG. 6 illustrates the conductivity of certain preferred polymers in the presence of different cations.

Y$_1$, X and Z are defined as previously.

Lewis base Y$_2$ is an anionic group capable of donating electrons to the Lewis acid group in the chain and forming a stable entity with the chain. The Lewis base may be an organic or an inorganic anion. In certain instances the Lewis base is an imide, preferably a sulfonyl-substituted imide wherein substituted sulfonyl is preferably —SO$_2$(CR$_2$)$_a$CR$_3$ wherein a is zero to about 4 and R is alkyl, hydrogen or halo preferably fluoro. In certain other instances, the Lewis base is an alkoxide, preferably methoxide, or an R-substituted alkoxide wherein R is alkyl or halo, most preferably fluoro. In yet other instances, the Lewis base Y$_2$ is cyanide, thiocyanate or a sulfide. In certain preferred instances the Lewis base Y$_2$ is an R-substituted alkyl wherein R is cyanide, thiocyanate, SO$_2$ or halo. In certain preferred instances R is a halo-substituted alkyl sulfonate.

In certain other instances Lewis base Y$_2$ is a phenyl or aryl or R-substituted phenyl wherein R is alkyl, alkoxide or halo, preferably fluoro. Other anionic Lewis bases which bind to or associate with tri-coordinated X in the Lewis acid-containing polymer to form stable polyanionic polymers are also suitable Lewis base Y$_2$ in preferred embodiments may be selected from the group comprising bis(trifluoromethanesulfonyl)imide [$^-$N(SO$_2$CF$_3$)$_2$ or TFSI$^-$], bis(pentafluoroethanesulfonyl)imide [N(SO$_2$CF$_2$CF$_3$)$_2$ or BETI$^-$], trifluoromethanesulfonate (CF$_3$SO$_3$$^-$), cyanide (CN$^-$), methoxide ($^-$OCH$_3$), 2,2,2-trifluoroethoxide ($^-$OCH$_2$CF$_3$), thiocyanate (SCN$^-$), sulfide (S$^{-2}$), phenyl(Ph$^-$), methyl phenyl, butylphenyl and cyanomethyl ($^-$CH$_2$CN). FIGS. 1–6 illustrate the conductivity of certain of these preferred embodiments.

In certain preferred embodiments of the conductive polyanionic polymers, X is boron, O is oxygen, Y$_1$ is methoxy-oligo(ethylene glycol) (MEG$_m$) or butoxy-oligo(propylene glycol) (BPG$_m$) having different repeat values m, Z is oligo(ethylene glycol) (EG$_n$) or oligo(propylene glycol) having different repeat values of n from 1 to about 20, and Y$_2$ is CN$^-$, SCN$^-$, CF$_3$SO$_3$$^-$, or TFSI$^-$, most preferably TFSI$^-$or CF$_3$SO$_3$$^-$. FIGS. 2 and 3 give the conductivity of these polymers respectively.

The physical properties of certain preferred polyanionic polymers are given in Table 2. In Table 2 the illustrated polyanionic polymers are complexes formed between certain anionic Lewis bases and Lewis acid-containing polymers having one of the formulae P(MEG$_m$EG$_n$B), P(MEG$_m$PG$_n$B) or P(BPG$_m$EG$_n$B). These formulae have been described more fully hereinabove (in the legend of Table 1). The polyanionic polymers in Table 2 were prepared with 1:1 mol ratio of boron to anion.

TABLE 2

APPEARANCE OF POLYANIONIC POLYMERS COMPRISING COMPLEXES OF CERTAIN ANIONIC LEWIS BASES AND LEWIS ACID-CONTAINING POLYMERS

| | Polymer | | | | |
|---|---|---|---|---|---|
| Li salt | Branch type | Spacer type | Branch length (m) | Spacer length (n) | Appearance |
| LiTFSI | MEG | EG | 1 | 9 | Viscous liquid |
| | | | 3 | 9 | |
| | | | 8 | 2 | |
| | | | | 5 | |
| | | | | 9 | |
| | | | | 14 | |
| | | | 12 | 9 | |
| | | PG | 8 | 13 | |
| | BPG | EG | 5 | 9 | |

TABLE 2-continued

APPEARANCE OF POLYANIONIC POLYMERS COMPRISING
COMPLEXES OF CERTAIN ANIONIC LEWIS BASES AND
LEWIS ACID-CONTAINING POLYMERS

| Li salt | Polymer | | | | Appearance |
|---|---|---|---|---|---|
| | Branch type | Spacer type | Branch length (m) | Spacer length (n) | |
| $LiSO_3CF_3$ | MEG | EG | 3 | 2 | |
| | | | | 5 | |
| | | | | 9 | |
| | | | | 14 | |
| | | | 8 | 2 | |
| | | | | 5 | |
| | | | | 9 | |
| | | | | 14 | |
| LiSCN | MEG | EG | 8 | 2 | Very viscous liquid |
| | | | | 5 | Viscous liquid |
| | | | | 9 | |
| | | | | 14 | |
| NaCN | MEG | EG | 8 | 2 | Greasy mass |
| | | | | 5 | Viscous liquid |
| | | | | 9 | |
| | | | | 14 | |
| $LiOCH_3$ | MEG | EG | 8 | 9 | Soft rubber |
| | | | | 14 | |
| $LiOCH_2CF_3$ | MEG | EG | 8 | 9 | Soft rubber |
| | | | | 14 | |
| $Li_2S$ | MEG | EG | 8 | 9 | Greasy mass |
| | | | | 14 | |

The present polyanionic polymers exhibit high conductivity as illustrated in FIGS. 1–9 and Table 3. This property makes them especially suitable for incorporation into electrochemical devices and especially in lithium batteries.

Table 3 illustrates conductivities at 25° C. of certain preferred polyanionic polymers comprising the Lewis acid tri-coordinated borate wherein ligand $Y_1$ is $MEG_m$, Z is $EG_n$ and Lewis base $Y_2$ is imide (TFSI⁻) or $CF_3SO_3^-$. In Table 3 the polyanionic polymers have the formulae $P(MEG_mEG_nB)$, $P(MEG_mPG_nB)$ or $P(BPG_mEG_nB)$. These formulae have been described more fully hereinabove (in the legend of Table 1). The polyanionic polymers in Table 3 were prepared with 1:1 mol ratio of boron to anion. These preferred compounds are exemplary of the conductivities required for use as electrolytes in electrochemical devices.

TABLE 3

CONDUCTIVITIES AT AMBIENT TEMPERATURE OF POLYANIONIC
POLYMERS COMPRISING COMPLEXES OF CERTAIN ANIONIC LEWIS
BASES AND LEWIS ACID-CONTAINING POLYMERS

| Li salt | Polymer | | | | Conductivity at 25° C. (Scm⁻¹) |
|---|---|---|---|---|---|
| | Branch type ($Y_1$) | Spacer type (Z) | Branch length (m) | Spacer length (n) | |
| LiTFSI | MEG | EG | 1 | 9 | $1.6 \times 10^{-5}$ |
| | | | 3 | 2 | $3.0 \times 10^{-6}$ |
| | | | | 5 | $1.5 \times 10^{-5}$ |
| | | | | 9 | $3.7 \times 10^{-5}$ |
| | | | | 14 | $5.3 \times 10^{-5}$ |
| | | | 8 | 2 | $3.4 \times 10^{-5}$ |
| | | | | 5 | $5.6 \times 10^{-5}$ |
| | | | | 9 | $6.2 \times 10^{-5}$ |
| | | | | 14 | $7.6 \times 10^{-5}$ |
| | | | 12 | 9 | $6.6 \times 10^{-5}$ |
| | | PG | 8 | 13 | $2.6 \times 10^{-5}$ |
| | BPG | EG | 5 | 9 | $3.7 \times 10^{-5}$ |
| $LiSO_3CF_3$ | MEG | EG | 3 | 2 | $1.9 \times 10^{-6}$ |
| | | | | 5 | $9.9 \times 10^{-6}$ |
| | | | | 9 | $1.5 \times 10^{-5}$ |
| | | | | 14 | $3.0 \times 10^{-5}$ |
| | | | 8 | 2 | $1.2 \times 10^{-5}$ |
| | | | | 5 | $2.7 \times 10^{-5}$ |
| | | | | 9 | $3.8 \times 10^{-5}$ |
| | | | | 14 | $4.8 \times 10^{-5}$ |

TABLE 3-continued

CONDUCTIVITIES AT AMBIENT TEMPERATURE OF POLYANIONIC POLYMERS COMPRISING COMPLEXES OF CERTAIN ANIONIC LEWIS BASES AND LEWIS ACID-CONTAINING POLYMERS

| | Polymer | | | | Conductivity |
|---|---|---|---|---|---|
| Li salt | Branch type ($Y_1$) | Spacer type (Z) | Branch length (m) | Spacer length (n) | at 25° C. ($Scm^{-1}$) |
| LiSCN | MEG | EG | 8 | 2 | $5.5 \times 10^{-6}$ |
| | | | | 5 | $1.2 \times 10^{-5}$ |
| | | | | 9 | $1.7 \times 10^{-5}$ |
| | | | | 14 | $1.7 \times 10^{-5}$ |
| NaCN | MEG | EG | 8 | 2 | $3.1 \times 10^{-7}$ |
| | | | | 5 | $1.6 \times 10^{-6}$ |
| | | | | 9 | $1.7 \times 10^{-6}$ |
| | | | | 14 | $1.2 \times 10^{-6}$ |
| $LiOCH_3$ | MEG | EG | 8 | 9 | $9.9 \times 10^{-7}$* |
| | | | | 14 | $7.2 \times 10^{-7}$* |
| $LiOCH_2CF_3$ | MEG | EG | 8 | 9 | $8.3 \times 10^{-7}$* |
| | | | | 14 | $5.4 \times 10^{-7}$ |
| $Li_2S$ | MEG | EG | 8 | 9 | $5.8 \times 10^{-7}$ |
| | | | | 14 | $8.6 \times 10^{-7}$ |

*The conductivity values were measured at 75° C.

These preferred compounds are exemplary of the conductivities required for use as electrolytes in electrochemical devices.

Certain polyanionic polymers wherein the Lewis acid-containing polymers comprise phenyl as $Y_1$ and are complexed to preferred Lewis base anions exhibit the glass transitions temperatures and physical appearance illustrated in Table 4. The conductivities are also illustrated in Table 4 and FIGS. 2D, 6 and 7B. In Table 4 the formulae $PBEG_n$ indicates P is phenyl, B is borate and EG is spacer group ethylene glycol and has repeat number n wherein TREG is triethylene glycol and n is 3,200 equals 5,400 equals 9,600 equals 14 and 1000 equals 23. The ratio of Lewis base anion to borate ion is indicated in parentheses.

TABLE 4

The Glass Transition Temperatures (Tg), Ambient Conductivities and Physical Appearance of Different Boron Containing Polyethers + Salt Complexes

| Compositions | $T_g$ (° C.) | Log $\sigma_{RT}$ (S · $cm^{-1}$) | Appearance at 25° C. |
|---|---|---|---|
| PBTREG: LiCN(B: CN = 4) | −40 | — | Viscous liquid |
| PBTREG: LiCN(B: CN = 1) | −23.4 | −5.60 | Viscous liquid |
| PB200EG: NaCN(B: CN = 2) | −14.5 | −5.20 | Viscous liquid |
| PB200EG: NaCN(B: CN = 1) | −7.5 | −5.37 | Viscous liquid |
| PB400EG: NaCN(B: CN = 2) | −59.5 | −4.98 | Viscous liquid |
| PB400EG: NaCN(B: CN = 1) | −58 | −4.56 | Viscous liquid |
| PB400EG: LiIm(B: Im = 2) | −44 | −4.75 | Viscous liquid |
| PB400EG: LiIm(B: Im = 1) | −37.8 | −5.20 | Viscous liquid |
| PB400EG: LiCN(B: CN = 1) | −50 | −4.87 | Viscous liquid |
| PB600EG: NaCN(B: CN = 2) | −57.3 | −4.86 | Viscous liquid |
| PB600EG: NaCN(B: CN = 1) | −46.5 | −5.09 | Viscous liquid |
| PB600EG: LiIm(B: Im = 2) | −56 | −4.54 | Viscous liquid |
| PB600EG: LiIm(B: Im = 1) | −47 | −4.70 | Viscous liquid |
| PB1000EG: NaCN(B: CN = 2) | −62.5 | −6.00 | Crystalline |
| PB1000EG: NaCN(B: CN = 1) | −61 | −5.76 | Crystalline |

In an important aspect of the present invention, methods for preparing the novel polyanionic chain polymers are given. In the methods, a precursor polymer comprising repeating Lewis acid groups linked into polymer chains comprising repeating spacer groups is contacted with a Lewis base under conditions whereby the Lewis base either bonds to the Lewis acid to form an anionic group or the Lewis base associates with the Lewis acid group to form an anionic trap. The counter ion on the supplied Lewis base becomes the counter ion on the resulting anionic polymer. The counter ion may be later exchanged for a different cation by known methods.

The subject polyanionic polymers comprising the Lewis bases disclosed herein exhibit a wide range of bonding strength with the Lewis acids. The order of binding strength is approximately as follows, wherein $Ph^-$ represents the strongest binding:

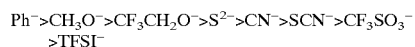

$Ph^- > CH_3O^- > CF_3CH_2O^- > S^{2-} > CN^- > SCN^- > CF_3SO_3^-$
$> TFSI^-$

The corresponding polyanionic polymers may be expected to exhibit a similar order of conductivities from low to high as illustrated herein.

Although these embodiments illustrate the nature of Lewis bases that are suitable to form conductive polyanionic polymers, this list is not intended to be inclusive. Indeed it is an important aspect of the present invention that a method and means are provided whereby polyanionic polymers of a desired conductivity or transport number can be prepared.

Certain modifications can be made to the present conductive polymers to enhance their mechanical properties so they can be more readily formed into films or otherwise fabricated into components suitable for use in secondary lithium batteries. Certain properties of the present polymers indicate their suitability for such purposes. They are soluble in certain solvents and plasticizers, which is a prerequisite for film formation. They may be cross-linked to form polyanionic composites, and these cross-linked composites are likewise soluble or swollen in plasticizers. The polymeric chains in the present polymers may be chosen to be reactive with other polymers so that they may be mixed with, bonded to, or otherwise incorporated into suitable non-ionic chain polymers, ionic chain polymers comprising other ionic groups, polymer networks or block-co-polymers. These modifications have been illustrated in the following examples. Certain similar modifications will be apparent to one skilled in the polymer arts.

In an important aspect of the present invention, the polyanionic chain polymers are cross-linked to form a polyanionic polymeric network. Any suitable cross-linking agent may be used, but most preferably the string polymers are chemically crosslinked with lithium boron hydride. Cross-linked polymers exhibit greater mechanical strength than the simple polymer chains.

In yet a further important aspect of the present invention, the polyanionic chain polymers are dissolved in solvents, preferably polar solvents, for example tetrahydrofuran (THF), acetonitrile and acetone. This advantageous property of the polyanionic polymers of the present invention makes them suitable for fabrication into films and coatings.

In a related aspect of the present invention, the polyanionic chain polymers incorporating weakly coordination anionic groups may be affixed to a solid surface and incorporated into an ion-exchange system. The spacer groups may be chosen to provide a tethering group for bonding to a surface such as an ion exchange resin bead or a porous membrane. In these applications the exchange capacity of the polymer may be determined by the charge density (length of spacer chain between anionic sites and charge of anionic site) and also the strength of bonding between the Lewis acid and the chosen anionic Lewis base.

In yet another aspect of the present invention, a method is given for increasing the conductivity of the polyanionic polymers wherein certain plasticizers are added to the polymers. Although it is not intended that the present invention be bound by a description of the mechanism of the plasticization effect, it is proposed that the local mobility of the polymeric chain is increased by the plasticizers and as a result the conductivity is increased.

In an advantageous embodiment of the invention, the anionic chain polymers and the cross-linked network polymers comprise certain plasticizers that enhance the conductivity of the polymer. The plasticized polymers and cross-linked polymers can be formed into conductive films by methods known in the art. Preferred plasticizers are carbonate and non-carbonate plasticizers. Suitable carbonate plasticizers are, for example, ethylene carbonate (EC), propylene carbonate (PC), butylene carbonate (BC), dimethylcarbonate (DMC) and diethyl carbonate (DEC). Suitable non-carbonate plasticizers are 1,2-dimethoxyethane (DME) and 1,2-diethoxyethane (DEE), dimethylsulfoxide (DMSO), dimethylsulfone (DMS), ethylmethylsulfone (EMS), γ-butyrolactone (BL). Preferred plasticizers comprise mixtures of carbonate plasticizer, preferably mixtures of ethylene carbonate and propylene carbonate (EC-PC), ethylene carbonate and dimethyl carbonate (EC-DMC), and propylene carbonate and dimethylxyethane (PC-DME).

The above-mentioned polyanionic polymers and cross-linked polymers and those embodiments wherein the polymers are dissolved in solvents or comprise plasticizers can be employed advantageously as solid polymeric electrolytes in most any type of electrochemical device. Most specifically the polyanionic polymers of the present invention are suitable SPE for electrochemical devices comprising lithium and in particular, lithium rechargeable batteries. The polyanionic polymers can be incorporated in electrochemical cells and lithium batteries, especially rechargeable lithium batteries.

These and other features, aspects and advantages of the present invention will become better understood with reference to the following descriptive examples.

EXAMPLE 1

This example illustrates the preparation of a Lewis acid-containing polymer wherein the Lewis acid comprises a tri-coordinated boron group wherein one ligand is phenyl and two ligands are oxygen linked to the polymeric chain containing repeating spacer units of ethylene glycol. This compound has the formula poly[phenyl-oligo(ethylene glycol)$_n$borate] wherein n is 3 to 23.

Phenylboronic acid [$PhB(OH)_2$] was refluxed with poly(ethylene glycol) (PEG), chosen from triethylene glycol, PEG200, PEG400, PEG600 or PEG1000, in toluene. (In these Examples, the use of triethylene glycol results in a value of n=3; for PEG200, n is 5; for PEG400, n is 9; for PEG600, n is 14 and for PEG1000, n is 23.) The water produced in the condensation reaction was collected and measured to determine the extent of the reaction. When the amount of recovered water indicated that reaction was complete, the solution was filtered and the solvent was removed on a rotary evaporator. The product was further dried by overnight evacuation at 100° C. in a vacuum oven. The product was a viscous liquid or crystal solid, depending on the PEG used.

EXAMPLE 2

This example illustrates the preparation of a Lewis acid-containing polymer as in Example 1 but wherein the polymer has repeat spacer groups of different chain lengths of propylene glycol. This compound has the formula poly[phenyl-oligo(propylene glycol)$_n$borate] wherein n is 7 to 17.

Phenylboronic acid was reacted with polypropylene glycol (PPG) as in Example 1. The PPG used was chosen from PPG425 (gives n=7), PPG725 (gives n=13), or PPG1000 (gives n=17). The result was a viscous liquid.

EXAMPLE 3

This example illustrates the preparation of a Lewis acid-containing polymer wherein the Lewis acid comprises a tri-coordinated boron group wherein one ligand is methyl and two ligands are oxygen linked to the polymeric chain containing repeating spacer units of ethylene glycol. This compound has the formula poly[methyl-oligo(ethylene glycol)$_n$borate] wherein n is 14.

Methyl boronic acid [$CH_3B(OH)_2$] was refluxed with PEG600 in toluene as described in Example 1. The result was a viscous liquid.

EXAMPLE 4

This example illustrates the preparation of a Lewis acid-containing polymer wherein the Lewis acid comprises a tri-coordinated boron group wherein one ligand is 2,4-difluorophenyl or 3,5-difluorophenyl and two ligands are oxygen linked to the polymeric chain containing repeating spacer units of ethylene glycol. This compound has the formula poly[2,4-difluorophenyl-oligo(ethylene glycol)$_n$borate] or poly[3,5-difluorophenyl-oligo(ethylene glycol)$_n$borate] wherein n is 9.

2,4-difluorophenylboronic acid or 3,5-difluorophenylboronic acid was refluxed with PEG400 in toluene as described in Example 1. The result was a viscous liquid.

EXAMPLE 5

This example illustrates the preparation of a Lewis acid-containing polymer wherein the Lewis acid group comprises borate with a first ligand methoxy-oligo(ethylene glycol)$_m$ and two ligand oxygens bound to the spacer groups oligo (ethylene glycol)$_n$. These compounds have the formula poly[methoxy-oligo(ethylene glycol)$_m$oligo(ethylene glycol)$_n$borate], wherein m represents the length of the branch and is 1–12 and n represents the length of spacer chain and is 2–14. This polymer is herein abbreviated as P(MEG$_m$EG$_n$B).

(1) In a dry flask equipped with stirring bar, water separation apparatus, condenser and CaCl$_2$ drying tube, were placed 0.02 mol boric acid, 0.02 mol poly(ethylene glycol) monomethyl ether with molecular weight chosen from 76 (gives m=1), 164 (gives m=3), 350 (gives m=8) and 550 (gives m=12), and some anhydrous benzene. The reaction mass was stirred and heated in an oil bath of about 100° C. until a clear solution was obtained. The benzene solution was cooled to room temperature and the amount of water removed from the reaction mass was measured.

(2) 0.02 mol poly(ethylene glycol) with molecular weight chosen from 106 (gives n=2), 200 (gives n=5), 400 (gives n=9) and 600 (gives n=14), was added quickly into the above reaction solution. The mixture solution was stirred and heated again in the oil bath of 110–120° C. until no more water was released (about 3 days). After the reaction was complete, the amount of water produced was measured in order to calculate the polymerization degree. The solvent in the viscous reaction mass was evaporated on a rotary evaporator at reduced pressure. The residual polymer was then dried in a vacuum oven at about 90° C. at high vacuum for 2 days, and kept in a dry glove box after drying.

The physical appearances of these polymers are given in Table 1.

EXAMPLE 6

This example illustrates the preparation of a Lewis acid-containing polymer wherein the Lewis acid group comprises borate with a first ligand methoxy-oligo(ethylene glycol)$_m$ and two ligand oxygens bound to the spacer groups oligo(propylene glycol)$_n$. These compounds have the formula poly[methoxy-oligo(ethylene glycol)$_m$oligo(propylene glycol)$_n$borate], wherein m represents the length of the branch and is 1–12 and n represents the length of spacer chain and is 7–17. This polymer is herein abbreviated as P(MEG$_m$PG$_n$B).

Boric acid was reacted with poly(ethylene glycol) monomethyl ether with molecular weight of 350 (gives m=8) in anhydrous benzene, and then with polypropylene glycol 725 (gives n=13) as described in Example 5. The physical appearances of these polymers are given in Table 1.

EXAMPLE 7

This example illustrates the preparation of the Lewis acid-containing polymer wherein the Lewis acid group comprises boron bound to three ligands. The first ligand is butoxy-oligo(propylene glycol)$_m$ and the other two ligands are oxygens bound to oligo(ethylene glycol)$_n$. The formula for these compounds is poly[butoxy-oligo(propylene glycol)$_m$ oligo(ethylene glycol)$_n$borate], wherein m represents the length of the branch and is 1–12 and n represents the length of spacer chain and is 2–14. This polymer is herein abbreviated as P(BPG$_m$EG$_n$B).

Boric acid was reacted with poly(propylene glycol) mono-butyl ether with molecular weight of 340 (gives m=5) in anhydrous benzene, and then with polyethylene glycol 400 (gives n=9) as described in Example 5. The physical appearance of the polymer is given in Table 1.

EXAMPLE 8

This example illustrates the preparation of a Lewis acid-containing polymer wherein the Lewis acid group comprises boron bound to three ligands. The first ligand is phenyl and the other two ligands are oxygens bound to dimethyl siloxane-co-tetraethylene glycol. The formula for these compounds is poly[oligo(dimethyl siloxane-co-tetraethylene glycol)phenylborate]. This polymer is herein abbreviated as P(DMS-co-TEG-co-PBA). P[DMS$_i$EG$_4$)$_n$PB].

To a flame dried 500 ml three-neck flask equipped with condenser, thermometer and dropping funnel was added 23.9 g (0.123 mole) tetraethylene glycol. The flask was heated to 100° C. and 18.0 g (0.123 mole) bis(dimethylamino)dimethyl silane was added dropwise under vigorous stirring. After the addition the reaction was continued at the same temperature while a lot of gas (dimethylamine) was bubbling out of the solution. When the gas evolution was nearly ceased (about 2 hours), 250 ml benzene was added to the reaction flask and followed by adding 15 g phenylboronic acid. The azeotropic distillation process was begun. The reaction was continued for 24 hours, and then the solution was filtered and evaporated to remove the solvent. A viscous product was obtained. It was further dried at 70° C. in the vacuum oven for one day.

EXAMPLE 9

This example illustrates the preparation of a polyanionic polymer from the Lewis acid-containing polymer of Example 1. The polyanionic polymer has the repeat unit —[O—B$^-$(Ph)$_2$—(OCH$_2$CH$_2$)$_n$]— wherein n is 14, and the counter ion is lithium.

The polymer from Example 1 was dissolved in dry ether, and cooled to 0–5° C. Phenyllithium in ether was added dropwise. After addition, the solution was stirred overnight. Then the solvent was removed by evaporation and a fluffy rubber was obtained. The product has a glass transition temperature of 219K. The conductivity was low, 3.6×10$^{-8}$ Scm$^{-1}$ at 25° C.

EXAMPLE 10

This example illustrates the preparation of an anion-trapping polymer electrolyte from the Lewis acid-containing polymer of Example 1. The polymer has the ethylene glycol repeat unit with 9 and 14, and the counter ion is lithium.

The polymer from Example 1 was reacted with lithium imide. The product was a viscous liquid and the physical properties and conductivities are shown in Table 4 and FIG. 2D. The conductivities of these polymers are given in FIG. 2D.

EXAMPLE 11

This example illustrates the preparation of a polyanionic polymer electrolyte from the Lewis acid-containing polymer of Example 1. The polyanionic polymer has the repeat unit —[O—B$^-$(Ph)(CN)—(OCH$_2$CH$_2$)$_n$]— wherein n is 3 and 9, and the counter ion is lithium.

The polymer from Example 1 was stirred with lithium cyanide in anhydrous THF at room temperature for 6 hours. After that the undissolved salt was filtered off and the solvent in the filtrate was evaporated on a rotary evaporator at reduced pressure. The product was further dried in a vacuum oven at 100° C. for one day and a viscous liquid was obtained. The properties of the polyanionic polymers are listed in Table 4. The conductivities of these polymers are given in FIGS. 6 and 7B.

EXAMPLE 12

This example illustrates the preparation of a polyanionic polymer electrolyte from the Lewis acid-containing polymer of Example 1. The polyanionic polymer has the repeat unit —[O—B$^-$(Ph)(CN)—(OCH$_2$CH$_2$)$_n$]— wherein n is 5 to 23, and the counter ion is sodium.

The polymer from Example 1 was stirred with sodium cyanide in anhydrous THF as described in Example 11. The properties and conductivities of the polyanionic polymers are shown in Table 4 and FIG. 6. The conductivities of these polymers are given in FIG. 6.

EXAMPLE 13

This example illustrates the preparation of a polyanionic polymer electrolyte from the Lewis acid-containing polymer of Example 1. The polyanionic polymer has the repeat unit —[O—B$^-$(Ph)(SCN)—(OCH$_2$CH$_2$)$_n$]— wherein n is 9 and 14, and the counter ion is lithium.

The polymer from Example 1 was stirred with lithium thiocyanate in anhydrous THF at room temperature to get a clear solution. The solvent was then evaporated on a rotary evaporator at reduced pressure. The product was further dried in a vacuum oven at 100° C. for one day and a viscous liquid was obtained. The properties and conductivities of the polyanionic polymers are shown in Table 4 and FIG. 7B. The conductivities of these polymers are given in FIG. 7B.

EXAMPLE 14

This example illustrates the preparation of a polyanionic polymer electrolyte from the Lewis acid-containing polymer of Example 1. The polyanionic polymer has the ethylene glycol repeat unit of 9 and 14, and the counter ion is lithium.

(1) Lithium sulfide and sublimed sulfur were stirred in anhydrous DME at room temperature till all solid dissolved to yield lithium polysulfide (Li$_2$S$_8$).

(2) The polymer from Example 1 was dissolved in DME and combined with lithium polysulfide solution in DME at room temperature with shaking. Polymer precipitate was formed out of the solution. It was collected and dried in a vacuum oven at 100° C. for one day. A sticky solid was obtained. The properties of the polyanionic polymers are listed in Table 4.

EXAMPLE 15

This example illustrates the preparation of an anion-trapping polymer from the Lewis acid-containing polymer of Examples 5–7. The polymer comprises imide complexed to a substituted borate. Spacer groups are ethylene glycol, and the counter ion is lithium.

About 2 g of various polymers from Examples 5–7 (wherein the length of MEG was 1–12, the length of BPG was 5, the number of spacer groups EG was 2–14 and PG was 13) was weighed in a dry glove box and dissolved in anhydrous tetrahydrofuran (THF). A quantitative amount of LiTFSI was added into the solution. The mixture was shaken occasionally to dissolve the salt and to make the solution homogeneous. The solvent in the clear solution was evaporated down on a rotavapor at reduced pressure. The residual was dried in a vacuum oven at about 90° C. at high vacuum for 2 days, and kept in a dry glove box after drying. The products were viscous liquids (see Table 2). The conductivities of these polymers are given in FIGS. 1A, 1B, 2A, 2B, and 2C. The conductivities at 25° C. of the complexes wherein the ligand Y$_1$ on the Lewis acid was MEG$_m$ or BPG$_m$ of determined lengths and spacer group Z was oligo(ethylene glycol)$_n$ (EG$_n$) or oligo(propylene glycol)$_n$ (PG$_n$) at determined lengths were listed in Table 3.

EXAMPLE 16

This example illustrates the preparation of an anion-trapping polymer from the Lewis acid-containing polymer of Example 5. The polymer comprises LiSO$_3$CF$_3$ complexed to a substituted borate. Spacer groups are ethylene glycol.

The complexes were prepared as in Example 15 by mixing various polymers from Example 5 (wherein the length of MEG$_m$ was 3 and 8 and the length of spacer groups EG$_n$ was 2–14) and LiSO$_3$CF$_3$ in anhydrous tetrahydrofuran (THF). The products were viscous liquids (see Table 2). The conductivities of these polymers are given in FIGS. 1A, 1B, 3A, 3B, and 3C. The conductivities at 25° C. of the complexes wherein the ligand Y$_1$ on the Lewis acid was MEG$_m$ or BPG$_m$ of determined lengths and spacer group Z was oligo(ethylene glycol)$_n$ (EG$_n$) or oligo(propylene glycol)$_n$ (PG$_n$) at determined lengths were listed in Table 3.

EXAMPLE 17

This example illustrates the preparation of a polyanionic polymer from the Lewis acid-containing polymer of Example 5. Polymers from Example 5 (wherein the length of MEG$_m$ was 8 and the length of spacer groups was 2 to 14) were reacted with lithium thiocyanate (LiSCN), as described in Example 15. The conductivities of the polymers are given in FIGS. 1A, 1B and 7A.

EXAMPLE 18

This example illustrates the preparation of a polyanionic polymer from the Lewis acid-containing polymer of Example 5 wherein the length of MEG was 8 and the number of spacer groups was 9.

Polymers from Example 5 were reacted with lithium cyanide (LiCN) as described in Example 11. The products were dried in a vacuum oven at 90° C. for 2 days.

EXAMPLE 19

This example illustrates the preparation of a polyanionic polymer from the Lewis acid-containing polymer of Example 5. Polymers from Example 5 (wherein the length of MEG$_m$ was 8 and the length of spacer groups was 2 to 14) were refluxed with sodium cyanide (NaCN) in anhydrous THF for 2 days, followed by the filtration of undissolved salt, evaporation of solvent and drying as described in Example 18. The conductivities of the polymers are given in FIGS. 1A, 1B and 8.

EXAMPLE 20

This example illustrates the preparation of a polyanionic polymer from the Lewis acid-containing polymer of Example 5. Polymers from Example 5 (wherein the length of MEG$_m$ was 8 and the length of spacer groups was 9 and 14) were reacted with lithium methoxide (LiOCH$_3$), as described in Example 15. The conductivities of the polymers are given in FIGS. 1A and 1B.

EXAMPLE 21

This example illustrates the preparation of a polyanionic polymer from the Lewis acid-containing polymer of Example 5. Polymers from Example 5 (wherein the length of $MEG_m$ was 8 and the length of spacer groups was 9 and 14) were reacted with lithium 2,2,2-trifluoroethoxide ($LiOCH_2CF_3$), as described in Example 15. The conductivities of the polymers are given in FIGS. 1A and 1B.

EXAMPLE 22

This example illustrates the preparation of a polyanionic polymer from the Lewis acid-containing polymer of Example 5. Polymers from Example 5 (wherein the length of $MEG_m$ was 8 and the length of spacer groups was 9 and 14) were reacted with lithium sulfide ($Li_2S$), as described in Example 19. The conductivities of the polymers are given in FIGS. 1A and 1B.

EXAMPLE 23

This example illustrates the synthesis of cyanomethyllithium ($LiCH_2CN$) and the preparation of a polyanionic polymer from the Lewis acid-containing polymer from Example 1.

(1) To the flame dried 250 ml flask equipped with condenser, thermometer and dropping funnel was added 10 ml dry ether and 0.6 g acetonitrile. The system was cooled to 0–5° C. and 5.84 ml butyllithium (2.5 m in hexane) diluted with 10 ml dry ether was added dropwise. After addition the solution was stirred for 6 hours.

(2) 10 g polymer from Example 1 wherein the ethylene glycol repeat unit is 9 (i.e., PB600EG) in 10 ml THF was added slowly to the reaction solution. The solution was stirred for another 4 hours before evaporating the solvent. The product was sticky solid, and its conductivity was measured by pressing it between two stainless steel electrodes. The conductivity was measured and is given in FIG. 4.

EXAMPLE 24

This example illustrates the preparation of a polyanionic polymer prepared from the Lewis acid-containing polymer of Example 8.

The polymer from Example 8 was stirred with Li Imide in anhydrous THF as described in Example 15. The molar ratio of boron in polymer from Example 8 to the anion of Lewis base (i.e., B:Im) was 2. The properties of the polyanionic polymer electrolytes were listed in Table 4 and FIG. 2D.

EXAMPLE 25

This example illustrates the plasticization of a polyanionic polymer prepared in Example 23. The plasticizing effect was measured by using EC/PC(1/1, o/w) as the plasticizer.

The polyanionic polymer electrolyte from Example 23 was mixed well with different amount of EC/PC (1/1, o/w). The conductivities of the plasticized electrolytes are given in FIG. 4.

EXAMPLE 26

This example illustrates the plasticization of an anion-trapping polymer prepared in Example 24. The anion-trapping polymer electrolyte from Example 24 was mixed well with different amount of EC/PC (1/1, o/w) as described in Example 25. The conductivities of the plasticized electrolytes are given in FIG. 5.

EXAMPLE 27

This example illustrates the preparation of a cross-linked polyanionic polymer from the Lewis-acid-containing polymers of Example 5. Lithium borohydride ($LiBH_4$) was used as a crosslinker.

Polymers from Example 5 (wherein the length of $MEG_m$ was 3 and the length of spacer groups was 2 to 14) was dissolved in anhydrous THF. $LiOCH_2CF_3$ was added and stirred to allow all salt to dissolve. The solution was then vigorously stirred and cooled to −78° C. in a dry ice-acetone bath. A certain amount of $LiBH_4$ in THF solution was added dropwise. After addition, the reaction mass was stirred at room temperature overnight. The solvent of the clear solution was evaporated down on a rotavapor under reduced pressure and the residual was dried in a vacuum oven at 90° C. for 2 days. The product was glass, stiff rubber and soft rubber depending on the length of the spacer. The room temperature conductivities of these crosslinked polyanionic electrolytes are $3.8 \times 10^{-7}$ $Scm^{-1}$ for the spacer length n=9 and $2.3 \times 10^{-7}$ $Scm^{-1}$ for the spacer length n=14.

EXAMPLE 28

This example illustrates the plasticization of a polyanionic polymer prepared in Example 27. The crosslinked polyanionic polymer electrolytes from Example 27 were mixed well with different amount of EC/PC (1/1, o/w) as described in Example 25. The conductivities of the plasticized electrolytes are given in FIGS. 9A and 9D.

EXAMPLE 29

This example illustrates the method for measuring the conductivity of the polyanionic polymers of Examples 9–28.

Conductivities of the polyanionic polymers prepared in Examples 9–28 were determined by a.c. impedance measurement as a function of temperature using a HP 4192A LF Impedance Analyzer in a frequency range from 5 Hz to 13 MHz, with dip-type cells containing two parallel platinum discs or block-type cells containing two stainless steel block electrodes. The cell constants of the dip-type cells were from 0.7 to 1.3 $cm^{-1}$, calibrated by 0.1M KCl aqueous solution.

EXAMPLE 30

This example illustrates the electrochemical properties of an anion-trapping polymer electrolyte from Example 15 wherein the length of $MEG_m$ was 8 and the length of spacer groups was 14, and the lithium salt was LiTFSI. The cyclic voltammograms were measured at room temperature on an EG&G potentiostat/galvanostat model 273, with a three-electrode dip-cell with stainless steel wire as working electrode and lithium metal as counter and reference electrodes. The scan rate was 5 $mVs^{-1}$. The cyclic voltammetric results were given in FIGS. 10A and 10B.

EXAMPLE 31

This example illustrates the electrochemical properties of an anion-trapping polymer electrolyte from Example 16 wherein the length of $MEG_m$ was 8 and the length of spacer groups was 14, and the lithium salt was $LiSO_3CF_3$. The cyclic voltammograms were measured as described in Example 30 and the results were given in FIGS. 11A and 11B.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

We claim:

1. A Lewis acid-containing polymer comprising repeat units having the formula:

$[AL]_p$ wherein
A is a Lewis acid group having the formula

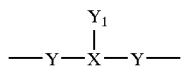

wherein X is a Group III element;
$Y_1$ is a ligand bound to X, wherein $Y_1$ is alkoxy-oligo(alkylene glycol);
Y is a ligand bound to X and to the polymer chain L;
L is a polymeric chain chemically linked to a ligand in said Lewis Acid and wherein L comprises a determined number of spacer groups and has the formula:

$L=(Z)_n$ wherein
Z is a spacer group; and
n is the number of each said spacer groups and wherein Z is the same or different in each occurrence; and
p is the number of repeat units in the polymer.

2. The polymer of claim 1 wherein X is aluminum or boron.

3. The polymer of claim 1 wherein X is boron.

4. The polymer of claim 1 wherein Y is oxygen.

5. The polymer of claim 1 wherein $Y_1$ is selected from the group consisting of methoxy-oligo(ethylene glycol)$_m$ and butoxy-oligo(propylene glycol)$_m$ wherein m is from 1 to about 50.

6. The polymer of claim 1 wherein Z is chosen from the group consisting of alkyl, R-substituted alkyl, alkoxy and R-substituted alkoxy wherein R is selected from the group consisting of hydrogen, halo, alkyl, alkoxy, phenyl and substituted phenyl.

7. The polymer of claim 6 wherein Z is a polyether having the formula $[O(CR_2)_aCR_2]_n$ wherein a is zero to about 20, n is from about 2 to 100 and R is halo, alkyl or phenyl.

8. The polymer of claim 7 wherein n is about 2 to 25.

9. The polymer of claim 6 wherein Z is oligo(ethylene glycol)$_n$ or oligo(propylene glycol)$_n$ wherein n is 2 to about 50.

10. The polymer of claim 1 wherein Z is a polysiloxane.

11. The polymer of claim 1 wherein X is boron, and Z is $[O(CR_2)_aCR_2])_n$ wherein n is from 2 to about 100, a is zero to about 20 and R is hydrogen, halo, alkyl or R-substituted alkyl wherein R is halo, alkyl or phenyl.

12. The polymer of claim 1 as a precursor in the formation of a conductive polyanionic polymer.

13. A Lewis acid-containing polymer comprising repeat units having the formula:

$[AL]_p$ wherein
A is a Lewis acid group having the formula

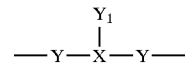

wherein X is a Group III element;
$Y_1$ is a ligand bound to X;
Y is a ligand bound to X and to the polymer chain L;
L is a polymeric chain chemically linked to a ligand in said Lewis Acid and wherein L comprises a determined number of spacer groups and has the formula:

$L=(Z)_n$ wherein
Z is a spacer group; and
n is the number of each said spacer groups and wherein Z is the same or different in each occurrence; and
p is the number of repeat units in the polymer,
wherein Z is a polysiloxane having the formula Si $[(CR_3)_2]$—$O(CR_2CR_2O)_n$ wherein n is 2 to about 50 and R is hydrogen or alkyl.

14. A Lewis acid-containing polymer comprising repeat units having the formula:

$[AL]_p$ wherein
A is a Lewis acid group having the formula

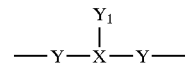

wherein X is a Group III element;
$Y_1$ is a ligand bound to X;
Y is a ligand bound to X and to the polymer chain L;
L is a polymeric chain chemically linked to a ligand in said Lewis Acid and wherein L comprises a determined number of spacer groups and has the formula:

$L=(Z)_n$ wherein
Z is a spacer group; and
n is the number of each said spacer groups and wherein Z is the same or different in each occurrence; and
p is the number of repeat units in the polymer,
wherein the polymer is selected from the group consisting of poly[methoxy-oligo(ethylene glycol)$_m$oligo(ethylene glycol)$_n$borate], poly[methoxy oligo(ethylene glycol)$_m$oligo(propylene glycol)$_n$borate] and poly[butoxy-oligo(propylene glycol)$_m$oligo(ethylene glycol)$_n$ borate] wherein m is 1 to about 12 and n is about 2–17.

15. A polyanionic polymer comprising a Lewis acid-containing polymer comprising repeat units having the formula:

[AL]$_p$ wherein
A is a Lewis acid group having the formula

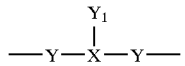

wherein X is a Group III element;
Y$_1$ is a ligand bound to X;
Y is a ligand bound to X and to the polymer chain L;
L is a polymeric chain chemically linked to a ligand in said Lewis Acid and wherein L comprises a determined number of spacer groups and has the formula:

L=(Z)$_n$ wherein
Z is a spacer group; and
n is the number of each said spacer groups
and wherein Z is the same or different in each occurrence; and
p is the number of repeat units in the polymer, and a salt of a Lewis base.

16. The polyanionic polymer of claim 15 wherein said salt comprises an anionic Lewis base selected from the group consisting of bis(trifluoromethanesulfonyl)imide, trifluoromethanesulfonate, thiocyanate, cyanide, methoxide, 2,2,2-trifluoroethoxide, sulfide and phenyl anion and a cation selected from the group lithium and sodium.

17. A polyanionic polymer chain comprising repeat units having the formula:

[M]$^{+k}_b$[AL]$^{-q}_p$ wherein
AL is a repeat unit in the chain wherein:
A is an anionic group having the formula

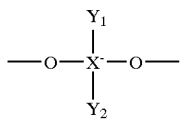

wherein:
wherein X is a Group III element;
Y$_1$ is a ligand bound to X;
Y$_2$ is a ligand bound to X or associated with X
wherein Y$_1$ and Y$_2$ and are the same or different in each occurrence;
L is a polymeric chain group chemically linked to oxygen in said anionic group and wherein L comprises a determined number of spacer groups and has the formula:

L=(Z)$_n$ wherein
Z is a spacer group; and
n is the number of each said spacer groups;
and wherein Z is the same or different in each occurrence;

and
p is the number of repeat units in the polymer;
q is the charge on the anion;
M$^+$ is a cation or cationic group;
b is the number of the cation;
k is the charge on the cation; and
bk equals pq.

18. The polyanionic polymer of claim 17 wherein X is aluminum or boron.

19. The polyanionic polymer of claim 17 wherein X is boron.

20. The polyanionic polymer of claim 17 wherein Y$_1$ is selected from the group consisting of aryl, phenyl, R-substituted phenyl, alkyl, R-substituted alkyl, alkoxy and R-substituted alkoxy wherein R is halo, alkyl, alkoxy, alkylene glycol or phenyl.

21. The polyanionic polymer of claim 17 wherein Y$_1$ is selected from the group consisting of phenyl and fluoro-substituted phenyl.

22. The polyanionic polymer of claim 17 wherein Y$_1$ is alkoxy-oligo(alkylene glycol).

23. The polyanionic polymer of claim 17 wherein Y$_1$ is selected from the group consisting of methoxy-oligo(ethylene glycol)$_m$ and butoxy-oligo(propylene glycol)$_m$ wherein m is from 1 to about 50.

24. The polyanionic polymer of claim 17 wherein Y$_2$ is selected from the group consisting of alkyl, aryl, phenyl, R-substituted phenyl, imide, R-substituted imide, R-substituted sulfonate, alkoxide, R-substituted alkoxide, thiocyanate, cyanide, R-substituted cyanide, sulfide and polysulfide, wherein R is hydrogen, alkyl, sulfonyl, or halo preferably fluoro.

25. The polyanionic polymer of claim 17 wherein Y$_2$ is selected from the group consisting of bis(trifluoromethanesulfonyl)imide, trifluoromethanesulfonate, thiocyanate, cyanide, methoxide, 2,2,2-trifluoroethoxide, sulfide and phenyl anion.

26. The polyanionic polymer of claim 17 wherein Y$_2$ is a strong Lewis base and is selected from the group consisting of methoxide, 2,2,2-trifluoroethoxide, sulfide and phenyl anion.

27. The polyanionic polymer of claim 17 wherein Y$_2$ is a weak Lewis base and is selected from the group consisting of bis(trifluoromethanesulfonyl)imide, trifluoromethanesulfonate.

28. The polyanionic polymer of claim 17 wherein Z is chosen from the group consisting of alkyl, R-substituted alkyl, alkoxy and R-substituted alkoxy wherein R is selected from the group consisting of hydrogen, halo, alkyl, alkoxy, phenyl and substituted phenyl.

29. The polyanionic polymer of claim 28 wherein Z is a polyether having the formula [O(CR$_2$)$_a$CR$_2$]$_n$ wherein a is zero to about 20, n is from about 2 to 100 and R is halo, alkyl or phenyl.

30. The polyanionic polymer of claim 29 wherein n is about 2 to 20.

31. The polyanionic polymer of claim 28 wherein Z is oligo(ethylene glycol)$_n$ or oligo(propylene glycol)$_n$ wherein n is 2 to about 50.

32. The polyanionic polymer of claim 17 wherein Z is a polysiloxane.

33. The polyanionic polymer of claim 32 wherein Z is a polysiloxane having the formula Si[(CR$_3$)$_2$]—O (CR$_2$CR$_2$O)$_n$ wherein n is 2 to about 50 and R is hydrogen or alkyl.

34. The polyanionic polymer of claim 17 wherein X is boron, Y$_1$ is phenyl, alkyl or alkoxy and Z is [O(CR$_2$)$_a$CR$_2$]$_n$ wherein n is from 2 to about 100, a is zero to about 20 and R is hydrogen, halo, alkyl or R-substituted alkyl wherein R is halo, alkyl or phenyl, M⁺ is lithium or sodium and $Y_2$ is selected from the group consisting of bis(trifluoromethanesulfonyl)imide, trifluoromethanesulfonate, thiocyanate, cyanide, methoxide, 2,2,2-trifluoroethoxide, sulfide and phenyl anion.

35. A polyanionic polymer of claim 17 selected from the group consisting of poly[methoxy-oligo(ethylene glycol)$_m$ oligo(ethylene glycol)$_n$ bis(trifluoromethanesulfonyl)imido borate], poly[methoxy-oligo(ethylene glycol)$_m$oligo(propylene glycol)$_n$bis(trifluoromethanesulfonyl)imido borate] and poly[butoxy-oligo(propylene glycol)$_m$oligo(ethylene glycol)$_n$bis(trifluoromethanesulfonyl)imido borate] wherein m is 1 to about 12 and n is 2 to about 17 and having a counter ion lithium or sodium.

36. A polyanionic polymer of claim 17 selected from the group consisting of poly[methoxy-oligo(ethylene glycol)$_m$ oligo(ethylene glycol)$_n$trifluoromethanesulfonato borate], poly[methoxy-oligo(ethylene glycol)$_m$oligo(propylene glycol)$_n$trifluoromethanesulfonato borate] and poly[butoxy-oligo(propylene glycol)$_m$oligo(ethylene glycol)$_n$trifluoromethanesulfonato borate] wherein m is 1 to about 12 and n is 2 to about 17 and having a counter ion of lithium or sodium.

37. A polyanionic polymer of claim 17 selected from the group consisting of poly[methoxy-oligo(ethylene glycol)$_m$, oligo(ethylene glycol)$_n$thiocyanato borate], poly[methoxy-oligo(ethylene glycol)$_m$oligo(propylene glycol)$_n$thiocyanato borate] and poly[butoxy-oligo(propylene glycol)$_m$oligo(ethylene glycol)$_n$thiocyanato borate] wherein m is 1 to about 12 and n is 2 to about 17 and having a counter ion of lithium or sodium.

38. A polyanionic polymer of claim 17 selected from the group consisting of poly[methoxy-oligo(ethylene glycol)$_m$ oligo(ethylene glycol)$_n$ cyanide borate), poly[methoxy-oligo(ethylene glycol)$_m$oligo(propylene glycol)$_n$cyanido borate] and poly(butoxy-oligo(propylene glycol)$_m$oligo(ethylene glycol)$_n$cyanido borate] wherein m is 1 to about 12 and n is 2 to about 17 and having a counter ion of lithium or sodium.

39. A polyanionic polymer of claim 17 selected from the group consisting of poly[methoxy-oligo(ethylene glycol)$_m$ oligo(ethylene glycol)$_n$methoxy borate], poly[methoxy-oligo(ethylene glycol)$_m$oligo(propylene glycol)$_n$methoxy borate] and poly[butoxy-oligo(propylene glycol)$_m$oligo(ethylene glycol)$_n$methoxy borate] wherein m is 1 to about 12 and n is 2 to about 17 and having a counter ion of lithium or sodium.

40. A polyanionic polymer of claim 17 selected from the group consisting of poly[methoxy-oligo(ethylene glycol)$_m$ oligo(ethylene glycol)$_n$(2,2,2-trifluoroethoxy)borate], poly[methoxy-oligo(ethylene glycol)$_m$oligo(propylene glycol)$_n$(2,2,2-trifluoroethoxy)borate] and poly[butoxy-oligo(propylene glycol)$_m$oligo(ethylene glycol)$_n$(2,2,2-trifluoroethoxy) borate] wherein m is 1 to about 12 and n is 2 to about 17 and having a counter ion of lithium or sodium.

41. A polyanionic polymer of claim 17 selected from the group consisting of poly[methoxy-oligo(ethylene glycol)$_m$ oligo(ethylene glycol)$_n$phenyl borate], poly[methoxy-oligo(ethylene glycol)$_m$oligo(propylene glycol)$_n$phenyl borate] and poly[butoxy-oligo(propylene glycol)$_m$oligo(ethylene glycol)$_n$phenyl borate] wherein m is 1 to about 12 and n is 2 to about 17 and having a counter ion of lithium.

42. A polyanionic polymer of claim 17 selected from the group consisting of poly[methoxy-oligo(ethylene glycol)$_m$ oligo(ethylene glycol)$_n$sulfido borate], poly[methoxy-oligo(ethylene glycol)$_m$oligo(propylene glycol)$_n$sulfido borate] and poly[butoxy-oligo(propylene glycol)$_m$oligo(ethylene glycol)$_n$sulfido borate] wherein m is 1 to about 12 and n is 2 to about 17 and having a counter ion of lithium.

43. A method for forming a polyanionic polymer of claim 17 comprising combining:
a. a precursor Lewis acid-containing polymer having the formula $$[AL]_p$$

wherein
A is a Lewis acid having the formula

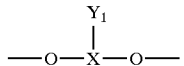

wherein X is a Group III element;
$Y_1$ is a ligand bound to X;
L is a polymeric chain chemically linked to a ligand in said Lewis Acid and wherein L comprises a determined number of spacer groups and has the formula:

$$L=(Z)_n$$

wherein
Z is a spacer group; and
n is the number of each said spacer groups
and wherein Z is the same or different in each occurrence; and
p is the number of repeat unites in the polymer;
b. the salt of a Lewis base having the formula $M^{+k}Y_2$, wherein $Y_2$ is an anionic Lewis base capable of combining or associating with X and wherein $Y_2$ is the same or different from $Y_1$;
$M^{+k}$ is a cation or cationic group;
under conditions whereby $Y_2$ combines or associates with X and $M^{+k}$ becomes a counter ion weakly bound to said polyanionic polymer.

44. The method of claim 43 wherein said supplied Lewis base is capable of binding to said Lewis acid-containing polymer.

45. The method of claim 43 wherein said supplied Lewis base is capable of associating with said Lewis acid-containing polymer.

46. Conductive polyanionic polymers made by the method of claim 43.

47. The method of claim 43 wherein:
X is boron,
$Y_1$ is selected from the group consisting of phenyl, R-substituted phenyl, alkyl, R-substituted alkyl, alkoxy and R-substituted alkoxy wherein R is halo, alkyl, alkoxy, alkylene glycol or phenyl,
$Y_2$ is an anionic Lewis base is selected from the group comprising bis(trifluoromethanesulfonyl)imide, trifluoromethanesulfonate, thiocyanate, cyanide, methoxide, 2,2,2-trifluoroethoxide, sulfide and phenyl anion; and M⁺ is lithium.
Z is chosen from the group comprising alkyl, R-substituted alkyl, alkoxy and R-substituted alkoxy wherein R is selected from the group comprising hydrogen, halo, alkyl, alkoxy, phenyl and substituted phenyl.

48. The polyanionic polymer of claim 17 comprising in addition a polymeric compound selected from the group consisting of a chain polymer, a polymer network or a block co-polymer.

49. The polyanionic polymer of claim 17 affixed to a solid matrix surface.

50. The polyanionic polymer of claim 17 formed into a film.

51. A polyanionic polymeric network comprising the cross-linked polymer of claim 17.

52. A polyanionic polymeric network of claim 51 formed by contacting chain polymers of claim 17 with lithium boron hydride under conditions whereby cross-linking between said chains occurs.

53. The polyanionic polymeric compound of claim 17 in a solvent selected from the group consisting of tetrahydrofuran, acetonitrile, and acetone.

54. The polyanionic polymer of claim 17 comprising in addition a plasticizer.

55. The polyanionic polymer of claim 54 wherein said plasticizer is a carbonate plasticizer selected from the group consisting of ethylene carbonate, propylene carbonate, butylene carbonate, dimethyl carbonate, and diethyl carbonate.

56. The polyanionic polymer of claim 54 wherein said plasticizer is a non-carbonate plasticizer selected from the group consisting of dimethylsulfoxide, dimethyl sulfone, ethylmethylsulfone, butyrolactone, 1,2-dimethoxyethane, and 1,2-diethoxyethane.

57. The polyanionic polymer of claim 54 wherein said plasticizer is a mixture of carbonate plasticizers selected from the group consisting of ethylene carbonate and propylene carbonate, dimethyl carbonate, and diethyl carbonate.

58. The polyanionic cross-linked chain polymer of claim 51 comprising in addition a plasticizer selected from the group consisting of carbonate plasticizer selected from the group consisting of ethylene carbonate, propylene carbonate, butylene carbonate, dimethyl carbonate, diethyl carbonate, and non-carbonate plasticizer selected from the group consisting of dimethylsulfoxide, dimethylsulfone, ethylmethylsulfone, butyrolactone, 1,2-dimethoxyethane, and 1,2-diethoxyethane.

59. The polyanionic polymer of claim 58 wherein said plasticizer is a mixture of carbonate plasticizers selected from the group consisting of ethylene carbonate and propylene carbonate, dimethyl carbonate and diethyl carbonate.

60. A solid polymeric electrolyte comprising a polyanionic polymer of claim 17.

61. A solid polymeric electrolyte comprising a polyanionic polymer of claim 50.

62. A solid polymeric electrolyte comprising a polyanionic polymer of claim 53.

63. A solid polymeric electrolyte comprising a polyanionic polymer of claim 54.

64. A solid polymeric electrolyte comprising a polyanionic polymer of claim 58.

65. The polyanionic polymer of claim 17 in an electrochemical cell.

66. The polyanionic polymer of claim 17 in a lithium battery.

67. A method of making a polyanionic conductive polymer comprising:
(a) supplying a Lewis acid-containing polymer comprising repeat units having the formula:

[AL]$_p$ wherein
A is a Lewis acid group having the formula

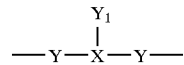

wherein X is a Group III element;
Y$_1$ is a ligand bound to X;
Y is a ligand bound to X and to the polymer chain L;
L is a polymeric chain chemically linked to a ligand in said Lewis Acid and wherein L comprises a determined number of spacer groups and has the formula:

L=(Z)$_n$ wherein
Z is a spacer group; and
n is the number of each said spacer groups and wherein Z is the same or different in each occurrence; and
p is the number of repeat units in the polymer;
(b) supplying a salt of a Lewis base; and
(c) combining said Lewis acid-polymer and said Lewis base salt under conditions whereby said Lewis base anion combines or associates with said Lewis acid-containing polymer to form a polyanionic polymer.

68. The method of claim 67 wherein said salt comprises a Group I metal ion.

69. The method of claim 68 wherein said metal ion is lithium.

70. A conductive polyanionic polymer formed by the method of claim 67.

71. A method for forming a Lewis acid-containing polymer of claim 1 comprising combining:
(a) Lewis acid group comprising a Group III element coordinated to three ligands wherein one said ligand is Y$_1$; and
(b) a polymeric group having a reactive group capable of reacting with said non-Y$_1$ ligands, and wherein said polymer comprises repeating spacer groups Z;
under conditions whereby said non-Y$_1$ ligands and the reactive group react to form the Lewis acid-containing polymer and a small molecule.

72. The method of claim 71 wherein said Lewis acid group is a boronic acid comprising two hydroxyl groups and a ligand Y$_1$, said reactive group in said polymeric group is hydroxyl, said repeating spacer groups are alkoxy and wherein said hydroxyls and said reactive group combine to form said Lewis acid-containing polymer and water.

73. The method of claim 71 wherein the repeating spacer groups are glycols selected from the group consisting of ethylene glycol, propylene glycol, and R substituted glycols wherein R is alkyl, alkoxy or aryl.

74. A method of preparing a Lewis acid-containing polymer comprising repeat units having the formula:

[AL]$_p$ wherein
A is a Lewis acid group having the formula

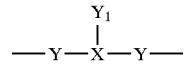

wherein X is boron;

$Y_1$ is a ligand bound to X;

Y is a ligand bound to X and to the polymer chain L;

L is a polymeric chain chemically linked to a ligand in said Lewis Acid and wherein L comprises a determined number of spacer groups and has the formula:

$L=(Z)_n$ wherein

Z is a spacer group; and n is the number of each said spacer groups and wherein Z is the same or different in each occurrence; and p is the number of repeat units in the polymer, the method comprising:

(a) combining boric acid with an $Y_1$ group comprising a reactive group, under conditions whereby one boric acid molecule reacts with one said reactive group to form a tri-coordinated boronic acid intermediate having one $Y_1$ ligand and two hydroxyls;

(b) contacting said intermediate with polyalkylene glycol under conditions whereby said intermediate and said polyalkylene glycol react to form said polymer and water.

75. Polymers prepared by the method of claim 74 wherein $Y_1$ comprises an alkoxy group and has the formula —$O(CR_2CR_2)_nOCR_3$ wherein R is hydrogen or alkyl and n is 1 to 50.

* * * * *